United States Patent [19]
Nakase

[11] Patent Number: 5,565,796
[45] Date of Patent: Oct. 15, 1996

[54] BUS DRIVE CIRCUIT, RECEIVER CIRCUIT, AND BUS SYSTEM

[75] Inventor: Yasunobu Nakase, Itami, Japan

[73] Assignee: Mitsubishi Denki Kabushiki Kaisha, Tokyo, Japan

[21] Appl. No.: 533,722

[22] Filed: Sep. 26, 1995

[30] Foreign Application Priority Data

May 24, 1995 [JP] Japan ................... 7-125113

[51] Int. Cl.⁶ .................................................. H03R 17/16
[52] U.S. Cl. ............................... 326/86; 326/30; 326/31; 326/83
[58] Field of Search .............................. 326/21, 31, 34, 326/82, 83, 86, 30

[56] References Cited

U.S. PATENT DOCUMENTS

| | | | |
|---|---|---|---|
| 5,034,629 | 7/1991 | Kinugasa et al. | 326/83 X |
| 5,111,080 | 5/1992 | Mizukami et al. | 326/82 |
| 5,138,194 | 8/1992 | Yoeli | 326/83 X |
| 5,233,238 | 8/1993 | Mattos | 326/83 X |
| 5,311,083 | 5/1994 | Wanlass | 326/21 X |
| 5,450,026 | 9/1995 | Morano | 326/86 X |

OTHER PUBLICATIONS

1994 Symposium on VLSI Circuits Digest of Technical Papers, pp. 21–22, 1994, H. Yamauchi, et al., "A Low Power Complete Charge–Recycling Bus Architecture for Ultra–High Data Rate ULSI'S".

1994 Symposium on VLSI Circuits Digest of Technical Papers, pp. 23–24, H. Kojima, et al., "Half–Swing Clocking Scheme For 75% Power Saving In Clocking Circuitry".

1994 Symposium on VLSI Circuits Digest of Technical Papers, pp. 29–30, 1994, M. Hiraki, et al., "Data–Dependent Logic Swing Internal Bus Architecture for Ultra–Low–Power LSIs".

Primary Examiner—David R. Hudspeth
Attorney, Agent, or Firm—Oblon, Spivak, McClelland, Maier & Neustadt, P.C.

[57] ABSTRACT

To obtain a bus system capable of saving power consumption without increasing the number of data lines. In precharge period, by charging and discharging by data line drive circuits (23p, 23n), potentials of data lines (30, 31) of a bus (1) are set to power source potential (VDD) and grounding potential (GND), respectively. In equalizing period, by connecting the data lines (30, 31) by a switch (3), the potentials of the data lines (30, 31) are set to an intermediate potential of the power source potential (VDD) and grounding potential (GND). In data transfer period, by selectively connecting between data line (3) and power source line, and between data line (31) and grounding line, by means of data line drive circuits (23p, 23n), the signals transmitted through the data lines (30, 31) are caused to swing between the intermediate potential and power source potential (VDD), and between the intermediate potential and grounding potential (GND). A receiver circuit (25) converts the transmitted signal into a signal swinging between the power source potential (VDD) and grounding potential (GND).

11 Claims, 17 Drawing Sheets

BUS DRIVE CIRCUIT, RECEIVER CIRCUIT, AND BUS SYSTEM

BACKGROUND OF THE INVENTION

1. Field of the Invention

The present invention relates to a bus drive circuit for driving a bus for transmitting information of plural circuit blocks or elements constituting a semiconductor integrated circuit, a receiver circuit for receiving signals transmitted through the bus, and a bus system using such bus drive circuit and receiver circuit, and more particularly to a bus drive circuit composed by using MOS transistors for reducing the logical amplitude of the signals transmitted through the bus, a receiver circuit using MOS transistors, and a bus system using such bus drive circuit and receiver circuit.

2. Description of the Background Art

Recently as the degree of integration of semiconductor integrated circuit (hereinafter called IC) is advanced, the quantity of data of IC that can be processed at a time is increased. For smooth exchange of data between circuit blocks inside the IC, along with increase of quantity of data processed by the IC, the width of bus (number of data lines) for transmitting the information by linking the circuit blocks is also increased.

FIG. 16 is a block diagram showing the constitution of a conventional bus system. In FIG. 16, reference numeral 1 is a bus composed of n data lines, 2 to 5 are circuit blocks provided in an IC, 6, 7 are data line drive circuits for driving the data lines of the bus 1 depending on the output of the circuit block 2, 8, 9 are data buffers for taking in the information from the data lines of the bus 1, and 10, 11 are data line drive circuits for driving the data lines of the bus 1 depending on the output of the circuit block 4. The bus drive circuit contains at least one data line drive circuit.

For example, the data line drive circuits 6, 7 and data line drive circuits 10, 11 are required so that their outputs be in high impedance state unless driving the bus 1 because their output lines are wired OR. To adjust the timing to set the data line drive circuits at high impedance, the data line drive circuits 6, 7 are controlled by signal E1, and the data line drive circuits 10, 11 are controlled by signal E2. The data line drive circuit for giving the output of a same circuit block to the bus is not required to be controlled always by a same signal, and it may be controlled by two signals E3, E4 as in, for example, a bus drive circuit 13. Or, as in the circuit block 5, a bus drive circuit 13 and a receiver circuit 12 may be both provided in one circuit block. Signals E1 to E4 for controlling the data line drive circuit are given from a control circuit not shown.

Generally, the wiring length of a bus is as long as several millimeters, and the parasitic capacity is large, and its charging and discharging current is not small. It is because the increase of charging and discharging current along with increase of bus width is becoming a serious problem that much is recently studied about the curtailment of current consumption of the bus.

A constitution of a bus system proposed in relation to curtailment of current consumption of the buses are shown in FIG. 17A and FIG. 17B. Specifically, FIG. 17A shows a circuit diagram of a bus drive circuit for transmitting two-bit information, and FIG. 17B shows a constitution of a bus drive circuit for transmitting information of four bits or more. The bus systems shown in FIG. 17A and FIG. 17B are disclosed, for example, by Hiroyuki Yamauchi, Hironori Akamatsu and Tsutomu Fujita, "A Low Power Complete Change-Recycling Bus Architecture for Ultra-High Data Rate ULSIs," 1994 Symposium on VLSI Circuits Digest of Technical Papers, pp. 21–22. In FIG. 17A, PM0 to PM4 are PMOS transistors, NM0 to NM4 are NMOS transistors, 20 to 23 are data lines, and Cp0, Cp1, Cn0, Cn1 are parasitic capacities of the data lines 20 to 23 composing each bus. Each data line of the buses shown in FIG. 17A and FIG. 17B is driven by either one of the two kinds of data line drive circuit. That is, one is a data line drive circuit PDR composed of P channel MOS transistors, and the other is a data line drive circuit NDR composed of N channel MOS transistors. In other words, the bus drive circuit is composed of plural sets of data line drive circuits PDR, NDR. When transmitting a signal through the bus, each data line drive circuit uses complementary signals in input and output. To the input of the data line drive circuit PDR, a signal Pin0 and its inverted signal Pin1 are given, and at the output, a signal Pout0 and its inverted signal Pout1 are generated. Similarly, to the input of the data line drive circuit NDR, a signal Nin0 and its inverted signal Nin1 are given, and at the output, a signal Nout0 and its inverted signal Nout1 are generated. EQP is an equalizing signal of the data line drive circuit PDR, and EQN is an equalizing signal of data line drive circuit NDR, and both are mutually complementary.

The operation of this circuit is described. For the simplicity of explanation, a bus of two-bit composition shown in FIG. 17A is mentioned. In this case the bus drive circuit of one circuit block is composed of one data line drive circuit PDR and one data line drive circuit NDR. A terminal PH of the data line drive circuit PDR is connected to a power source potential VDD, and a terminal NL of the data line drive circuit NDR is connected to a grounding potential GND. A terminal PL of the data line drive circuit PDR and a terminal NH of the data line drive circuit NDR are connected with each other.

In an initial state, the terminal PH is supposed to be at power source potential VDD, the terminal NL at grounding potential GND, and the terminals PL and NH at VDD/2. The parasitic capacities Cp0, Cp1, Cn0, Cn1 are supposed to be all equal in quantity. FIG. 18 shows a timing chart of the circuit shown in FIG. 17A. One cycle of operation of the data line drive circuits PDR, NDR is composed of an equalizing period Ep and a data transfer period Ev. First, in the equalizing period Eq, the equalizing signal EQN is at high level and the equalizing signal EQP is at low level, and the data lines 20, 21 are equalized, and also the data lines 22, 23 are equalized. That is, in the data line drive circuit PDR, as the P channel MOS transistor PM4 conducts, the data lines 20, 21 are connected. The potential of the data lines 20, 21 is determined as follows by the rule of conservation of electric charges accumulated in the parasitic capacities Cp0 and Cp1. Between the parasitic capacity Cp0 and the electric charge Qp0 before being equalized, there is a relation of $Qp0=Cp0 \cdot VDD$. On the other hand, between the parasitic capacity Cp1 and the electric charge Qp1 before being equalized, there is a relation of $Qp1=Cp1 \cdot VDD/2$. The potential V of the data lines 20, 21 after being equalized is given in the form of $V \cdot (Cp0-Cp1)=Qp0-Qp1$, that is, the potential V is $3 \cdot VDD/4$. In the data line drive circuit NDR, as the N channel MOS transistor NM4 conducts, data lines 22, 23 are connected. The potential of the data lines 22 23 is VDD/4. At this time, in order that the other transistors than the transistors PM4, NM4 for equalizing may not conduct, both signals Pin0, Pin1 are at high level, while signals Nin0, Nin1 are both at low level.

In the next period of the equalizing period, that is, in the data transfer period Ev, the data is transferred. At this time, a potential depending on the data being transmitted is given to each input of the data line drive circuits PDR, NDR. For example, signal Pin0 is supposed to be at high level, and signal Pin1 at low level. Similarly, the signal Nin0 is supposed to be at high level, and signal Nin1 at low level. At this time, all of P channel MOS transistors PM1, PM2 and N channel MOS transistors NM0, NM3 conduct, and the parasitic capacity of the data line 21 is charged, and the output signal Pout1 becomes nearly equal to VDD, while the parasitic capacity of the data line 23 is discharged, and the output signal Nout1 becomes nearly equal to GND.

The data line 20 and data line 22 are connected through the transistors PM2, NM0. Seeing that the signal Pout0 outputted from the data line 20 at the equalizing point was 3·VDD/4, and the signal Nout0 outputted from the data line 22 was VDD/4, the potential of the mutually connected data lines 20, 22 is found to be VDD/2.

When the input signal Pin0 is at low level and its complementary signal or input signal Pin1 is at high level, the signal Pout0 outputted through the data line 20 is VDD, and the signal Pout1 outputted through the data line 21 is VDD/2. When the input signal Nin0 is at low level and the input signal Nin1 is at high level, the signal Nout0 outputted through the data line 22 is GND, and the signal Nout1 outputted through the data line 23 is VDD/2.

At the data receiver side, the potential difference of these complementary signals is detected. Thus, in the data transfer period, depending on the input signals Pin0, Pin1, mutually complementary output signals Pout0, Pout1 are outputted to a pair of data lines 20, 21, and depending on the input signals Nin0, Nin1, mutually complementary output signals Nout0, Nout1 are outputted to a pair of data lines 22, 23. If the bus width exceeds two bits, that is, if the bus has two pairs or more of data lines, it is extended by overlaying the data line drive circuits PDR, NDR shown in FIG. 17A in series. For example, by combining as shown in FIG. 17B when the bus width is n bits (n being an even number), n/2 data line drive circuits PDR are connected in series from the power source side, and n/2 data line drive circuits NDR are connected in series therefrom to the grounding side.

Seeing the operation of this bus system from other point of view, the electric charge is exchanged between data lines composing one pair of data lines in the equalizing period, and the electric charge is exchanged between the adjacent pair of data lines in the data transfer period. When the bus width is two bits as shown in FIG. 17A, the electric charge is supplied from the power source line for feeding the power source potential VDD in the data transfer period into the parasitic capacity Cp0 of the data line 20, and in the next equalizing period, the charge is transferred from the parasitic capacity Cp0 to the parasitic capacity Cp1 of the data line 21. Furthermore, the charge is transferred from the parasitic capacity Cp0 of the data line 20 to the parasitic capacity Cn0 of the data line 22 in the next data transfer period, and the charge is further transferred from the parasitic capacity Cn0 of the data line 22 into the parasitic capacity Cn1 of the data line 23 in the next equalizing period. Consequently, the charge is discharged into the grounding line for supplying the grounding potential GND from the parasitic capacity Cn1 of the data line 23 in the next data transfer period.

In this way, the electric charge consumed in one cycle is only the first charge charged into the parasitic capacity Cp0 from the power source line for feeding the power source potential VDD, in other words, only the charge discharged into the grounding line for feeding the grounding potential GND from the parasitic capacity Cn1. That is, it is only the electric charge necessary for pulling up the output signal Pout0 outputted through the data line 20 from 3·VDD/4 to VDD, and hence the current consumption is saved greatly as compared with the data line drive circuit composed of inverter shown in FIG. 16.

The conventional bus drive circuit is thus constituted, and hence involves the following problems. First, if using the conventional bus drive circuits shown in FIG. 17A and FIG. 17B, the output signals must be complementary, and two data lines are needed for transmitting one-bit data. Recently, the bus width tends to increase notably, and the area occupied by the bus in the IC cannot be ignored, and the increase in the number of data lines per bit is very disadvantageous for increasing the bus width. Using the conventional bus system shown in FIG. 16, such problem can be avoided, but the power consumption cannot be curtailed.

Secondly, if using the bus drive circuits shown in FIG. 17A and FIG. 17B, the potential of the data lines must be set at specific potential, and it takes time to initialize the data lines. As shown in the description of operation above, the bus drive circuits PDR, NDR do not operate as desired unless the potential of the terminal PH of the data line drive circuit PDR is VDD, the potential of the terminal NL of the data line drive circuit NDR is GND, and the potential of the terminals PL and NL is VDD/2 in the initial state. When turning on the power source, the potential of all data lines is unstable, and equalizing and transfer of dummy data must be repeated a considerable number of times in order to define the data line potentials at desired values.

A third problem relates to the operating speed of the bus drive circuit. To use the bus drive circuits shown in FIG. 17A and FIG. 17B, it is required to pass two MOS transistors connected in series when transferring the electric charge between adjacent pairs of data lines in the data transfer period. Or, along with the increase in the number of bits, when the data line drive circuits are stacked up in series, some of the multiple bus drive circuits being stacked up are remote from the power source. Because of the body effect of the MOS transistor, the driving force is lowered in the data line drive circuit PDR remote from the power source, and the driving force is lowered in the data line drive circuit NDR remote from the grounding potential. Hence, a longer time is needed until the data line potentials are established, and to cope this, ultimately, the operating speed of the bus system must be slowed down.

Relating to the third problem, it leads to a fourth problem concerning the operating speed of the receiver circuit. The potential difference between two data lines for composing the pair of data line is VDD/n where n is the bus width, and as the bus width increases, a receiver circuit of high performance capable of detecting a smaller potential difference is needed. Generally, as the potential difference becomes smaller, the time for detecting it becomes outstandingly long. Besides, as the potential difference becomes smaller, the effect of very small noise existing in the data line cannot be ignored, and hence for practical reason, the applicable bit width is limited accordingly.

SUMMARY OF THE INVENTION

A first aspect of the invention relates to a bus drive circuit being formed in an integrated circuit for driving a bus for transmitting different information in each data line in the sequence of precharge period, equalizing period, and data transfer period, comprising first switch means formed in the integrated circuit, and connected between first and second data lines having specific capacities being included in the bus, for connecting the first and second data lines in the equalizing period in response to an equalizing signal showing the equalizing period, second switch means formed in the integrated circuit, having a first terminal connected to the first data line and a second terminal connected to a first power source, for connecting between the first terminal and the second terminal in the precharge period, third switch means formed in the integrated circuit, having a first terminal connected to the second data line, and a second terminal connected to a second power source, for connecting between the first terminal and the second terminal of the third switch means in the precharge period, and at least either one of fourth switch means and fifth switch means formed in the integrated circuit, the fourth switch means having a first terminal connected to the first data line, a second terminal connected to a first power source, and a control terminal for receiving a first input signal showing the information to be transmitted by the first data line, for selectively connecting between the first terminal and the second terminal of the fourth switch means on the basis of the first input signal received by the control terminal of the fourth switch means in the data transfer period, the fifth switch means having a first terminal connected to the second data line, a second terminal connected to a second power source, and a control terminal for receiving a second input signal showing the information to be transmitted by the second data line, for selectively connecting between the first terminal and the second terminal of the fifth switch means on the basis of the second input signal to be received by the control terminal of the fifth switch means in the data transfer period.

A second aspect of the invention relates to a bus drive circuit being formed in an integrated circuit for driving a bus for transmitting different information in each data line in the sequence of precharge period, equalizing period, and data transfer period, comprising first switch means formed in the integrated circuit, and connected between first and second data lines having specific capacities being included in the bus, for connecting the first and second data lines in the equalizing period in response to an equalizing signal showing the equalizing period, second switch means formed in the integrated circuit, having a first terminal connected to the first data line, a second terminal connected to a first power source, and a control terminal for receiving a first input signal for showing the information to be transmitted by the first data line, connecting between the first terminal and the second terminal in the precharge period, and selectively connecting between the first terminal and the second terminal on the basis of a first input signal received by the control terminal in the data transfer period, and third switch means formed in the integrated circuit, having a first terminal connected to the second data line, a second terminal connected to a second power source, and a control terminal for receiving a second input signal showing information to be transmitted by the second data line, connecting between the first terminal and the second terminal of the third switch means in the precharge period, and selectively connecting between the first terminal and second terminal of the third switch means on the basis of the second input signal received by the control terminal of the third switch means in the data transfer period.

A third aspect of the invention relates to a bus drive circuit of the second aspect, wherein the second switch means comprises a first MOS transistor of first conductive type having a first current electrode connected to the first data line, a second current electrode connected to the first power source, and a control electrode for receiving the first input signal, and the third switch means comprises a first current electrode connected to the second data line, a second current electrode connected to the second power source, and a second MOS transistor of second conductive type having a control electrode for receiving a second input terminal.

A fourth aspect of the invention relates to a bus drive circuit of the second aspect, wherein the second switch means comprises a first MOS transistor of first conductive type having a first current electrode connected to the first data line, a second current electrode connected to the first power source, and a control electrode, and a first converting circuit for receiving a precharge signal, the equalizing signal, and a first input signal, and outputting a signal for setting the first MOS transistor in conductive state in the precharge period, a signal for setting the first MOS transistor in non-conductive state in the equalizing period, and the first input signal in the data transfer period, to the control electrode of the first MOS transistor, and the third switch means comprises a second MOS transistor of second conductive type having a first current electrode connected to the second data line, a second current electrode connected to the second power source, and a control electrode, and a second converting circuit receiving the precharge signal, the equalizing signal, and a second input signal, and outputting a signal for setting the second MOS transistor in conductive state in the precharge period, a signal for setting the second MOS transistor in non-conductive state in the equalizing period, and the second input signal in the data transfer period, to the control electrode of the second MOS transistor.

An fifth aspect of the invention relates to a bus system comprising a bus provided in a integrated circuit, having plural data lines including a first data line having a first capacity and a second data line having a second capacity, for transmitting information between plural circuit blocks by passing sequentially through a precharge period for connecting the first data line to a first power source, and connecting the second line to a second power source, an equalizing period for not connecting the plural data lines to the first and second power sources and connecting the first data line and second data line mutually, and a data transfer period for transmitting different information to each data line, a bus drive circuit comprising first switch means formed in the integrated circuit, and connected between the first and second data lines, for connecting the first and second data lines in the equalizing period depending on an equalizing signal showing the equalizing period, second switch means formed in the integrated circuit, having a first terminal connected to the first data line, a second terminal connected to a first power source, and a control terminal for receiving a first input signal showing information to be transmitted by the first data line, for connecting between the first terminal and the second terminal of the second switch means in the precharge period, and selectively connecting between the first terminal and the second terminal of the second switch means on the basis of the input signal received by the control terminal of the second switch means in the data transfer period, and third switch means formed in the integrated circuit, having a first terminal connected to the second data line, a second terminal connected to a second power source, and a control terminal for receiving a second input signal showing the information to be transmitted through the second data line, for connecting between the first terminal and the second terminal in the precharge period, and selectively connecting between the first terminal and the second terminal on the basis of the second input terminal received at the control terminal in the data transfer period, a receiver circuit provided in the integrated circuit, and connected at least to one of the first and second data lines, for outputting a signal swinging between a potential outputted by the first power source and a potential outputted by the second power source, depending on the signal transmitted through the first or second data line, and a control circuit provided in the integrated circuit, and connected at least to the bus drive circuit and the receiver circuit, for outputting at least a data transfer signal for indicating the data transfer period.

A sixth aspect of the invention relates to a bus system of the fifth aspect, wherein the receiver circuit comprises a first MOS transistor of first conductive type having a control electrode connected to the first or second data line, a first current electrode connected to the first or second power source, and a second current electrode, a second MOS transistor of first conductive type having a first current electrode connected to the second current electrode of the first MOS transistor, a control electrode for receiving the data transfer signal, and a second current electrode connected to a signal line possessing a specific capacity, and a third MOS transistor of second conductive type having a first current electrode connected to either the first or second power source to which the first current electrode of the first MOS transistor is not connected, a second current electrode connected to the signal line, and a control electrode for receiving the data transfer signal, wherein the second MOS transistor is in non-conductive state and the third MOS transistor is in conductive state in other period than data transfer period, and, in the data transfer period when receiving a signal from a data line, the second MOS transistor is in conductive state and the third MOS transistor is in non-conductive state.

A seventh aspect of the invention relates to a bus system of the fifth aspect, wherein the control circuit generates a precharge signal showing a precharge period of a quarter of a first clock, an equalizing signal showing an equalizing period of a quarter of the first clock, and the data transfer signal showing a data transfer period of a half period of the first clock from the first clock and a second clock having a doubled frequency of the first clock and sometimes coinciding with the rise timing of the first clock.

An eighth aspect of the invention relates to a bus system of the fifth aspect, wherein the control circuit generates a precharge signal showing a precharge period of a quarter of a first clock, an equalizing signal showing an equalizing period of a quarter of the first clock, and the data transfer signal showing a data transfer period of a half period of the first clock from the first clock and a second clock having same frequency of the first clock and differing in phase by a quarter period.

In the first aspect, the second and third switch means charge and discharge the first data line and second data line respectively at the output potential of the first power source and output potential of the second power source in the precharge period. Consequently, the first switch means mutually connects the charged and discharged first and second data lines, and the potential of the first and second data lines is set at an intermediate potential between the output potential of the first power source and output potential of the second power source. In the data transfer period, the fourth switch means connects the first data line and first power source selectively on the basis of the first input signal. When the first data line and first power source are connected, the first data line transmits the output potential of the first power source, while the intermediate potential is transmitted when not connected. In the data transfer period, the fifth switch means connects the second data line and second power source selectively on the basis of the second input signal. When the second data line and second power source are connected, the second data line transmits the output potential of the second power source, while the intermediate potential is transmitted when not connected.

In this way, the logical amplitude of the signal transmitted through the first data line is narrowed to the output potential of the first power source and the intermediate potential, and the logical amplitude of the signal transmitted through the second data line is narrowed to the output potential of the second power source and the intermediate potential.

The data can be transferred by the signal swinging between the intermediate potential obtained by connecting the precharged first data line and second data line in the equalizing period and the output potential of the first power source, or between the intermediate potential and the output potential of the second power source, so that the power consumption can be saved without increasing the number of data lines.

In the second aspect, the second and third switch means charge and discharge the first data line and second data line respectively at the output potential of the first power source and output potential of the second power source in the precharge period. Consequently, the first switch means mutually connects the charged and discharged first and second data lines, and the potential of the first and second data lines is set at an intermediate potential between the output potential of the first power source and output potential of the second power source. In the data transfer period, the second switch means connects the first data line and first power source selectively on the basis of the first input signal. When the first data line and first power source are connected, the first data line transmits the output potential of the first power source, while the intermediate potential is transmitted when not connected. In the data transfer period, the third switch means connects the second data line and second power source selectively on the basis of the second input signal. When the second data line and second power source are connected, the second data line transmits the output potential of the second power source, while the intermediate potential is transmitted when not connected.

In this way, the logical amplitude of the signal transmitted through the first data line is narrowed to the output potential of the first power source and the intermediate potential, and the logical amplitude of the signal transmitted through the second data line is narrowed to the output potential of the second power source and the intermediate potential.

The data can be transferred by the signal swinging between the intermediate potential obtained by connecting the precharged first data line and second data line in the equalizing period and the output potential of the first power source, or between the intermediate potential and the output potential of the second power source, so that the power consumption can be saved without increasing the number of data lines. In the third aspect, the second switch means and third switch means connect the first data line and first power source in the precharge period, respectively by the first MOS transistor and the second MOS transistor, and also connects the first data line and first power source selectively on the basis of the first input signal received in the control electrode in the data transfer period. By composing the second and third switch means by one MOS transistor each, the constitution of the second and third switch means is simplified, and the degree of integration is advanced.

In the fourth aspect, the first converting circuit controls the action of the second switch means, by means of precharge signal, equalizing signal and first input signal, so as to correspond to the bus for transferring data through the precharge period, equalizing period, and data transfer period. Accordingly, the first input signal is not required to have such a format as to correspond to each stage of precharge period, equalizing period and data transfer period, and the first input signal is required only to possess information to be transmitted, and hence the constitution of the circuit for outputting the first input signal can be simplified. Similarly, the second converting circuit controls the action of the third switch means, by means of precharge signal, equalizing signal and second input signal, so as to correspond to the bus for transferring data through the precharge period, equalizing period, and data transfer period. Accordingly, the second input signal is not required to have such a format as to correspond to each stage of precharge period, equalizing period and data transfer period, and the second input signal is required only to possess information to be transmitted, and hence the constitution of the circuit for outputting the first input signal can be simplified, thereby enhancing the degree of integration.

In the fifth aspect, the first data line and second data line of the bus are respectively charged and discharged at the output potential of the first power source and output potential of the second power source, by the second and third switch means of the bus drive circuit in the precharge period. Consequently, the charged and discharged potentials of the first and second data lines of the bus are mutually connected by the first switch means of the bus drive circuit, thereby becoming an intermediate potential between the output potential of the first power source and output potential of the second power source. In the data transfer period, the bus drive circuit selectively connects the first or second data line and the first or second power source, depending on the output of the circuit block, by the second and third switch means. When the first or second data line and first or second power source are connected, the first or second data line transmits the output potential of the first or second power source, while the intermediate potential is transmitted when not connected.

In this way, the logical amplitude of the signal transmitted through the first and second data lines can be narrowed to the difference between the output potentials of the first and second power sources and the intermediate potential. The receiver circuit converts the logical amplitude of these signals transmitted through the first or second data lines, and outputs as the signal swinging between the output potential of the first power source and output potential of the second power source. The control circuit outputs at least the data transfer signal, and controls so that the bus drive circuit and receiver circuit may act to exchange data only in the data transfer period.

Transmission of information between circuit blocks for processing the signal swinging between the output potentials of the first and second power sources can be effected by transferring by the signal swinging between the intermediate potential of the output potentials of the first and second power source and the output potential of first or second power source, so that the power consumption can be saved without increasing the number of data lines of the bus.

In the sixth aspect, the third MOS transistor connects the signal line and either power source to which the first current electrode of the first MOS transistor is not connected, in other period than data transfer period, and charges the signal line to the output potential of the specific power source. On the other hand, in other period than data transfer period, the second MOS transistor does not connect the first MOS transistor and signal line, thereby preventing the signal line from being connected to the first power source.

When receiving a signal from the data line, the third MOS transistor does not connect the signal line and either power source to which the first current electrode of the first MOS transistor is not connected, so that the potential of the signal line is allowed to vary. When receiving the signal from the data line in the data transfer period, the first MOS transistor connected to the signal line by the second MOS transistor determines the potential of the signal line either at the same charged or discharged state or at the output potential of the power source connected to the first current electrode of the first MOS transistor, depending on the signal received in its control electrode. Accordingly, if the signal transmitted through the data line swings between the output potential of the first or second power source and the intermediate potential, the receiver circuit can output a signal swinging between the output potential of the first power source and output potential of the second power source. The precharged signal line is driven by the first MOS transistor, and hence its action is fast.

In a simple constitution comprising three transistors, the signal swinging between the intermediate potential and output potential of the first power source, or between the intermediate potential and output potential of the second power source can be promptly converted and outputted as the signal swinging between the output potentials of the first power source and second power source, so that the processing speed can be enhanced while advancing the degree of integration. In the seventh aspect, the control circuit determines whether or not to transfer the data, for example, by first clock, and determines the precharge period and equalizing period by second clock in a period not transferring data, and therefore the data transfer period can be easily set at half of the first clock in the precharge period of quarter period of the first clock and in the equalizing period in quarter period of the first clock, and therefore the data transfer period is relatively longer as compared with the precharge period and equalizing period, and the data transfer is easy, so that the design of the bus system may be easy.

In the eighth aspect, the control circuit determines whether or not to transfer the data, for example, by first clock, and precharges in a period not transferring data and when first clock and second clock are same, and equalizes in a period not transferring data and when first clock and second clock are different, and therefore the data transfer period can be easily set at half of the first clock in the precharge period of quarter period of the first clock and in the equalizing period in quarter period of the first clock, and therefore the data transfer period is relatively longer as compared with the precharge period and equalizing period, and the data transfer is easy, so that the design of the bus system may be easy.

It is therefore an object of the present invention to solve the problems in the prior art, and provide a bus drive circuit lowered in the current consumption as compared with a bus drive circuit of which logical amplitude swings fully between the power source voltage VDD and grounding voltage GND, being superior to the bus drive circuit shown in FIG. 17B in the area, speed, and number of constituent elements, a receiver circuit to be used in pair with this bus drive circuit, and a bus system composed thereof.

These and other objects, features, aspects and advantages of the present invention will become more apparent from the following description of the present invention when taken in conjunction with the accompanying drawings.

DESCRIPTION OF THE PREFERRED EMBODIMENTS

Figure 1:
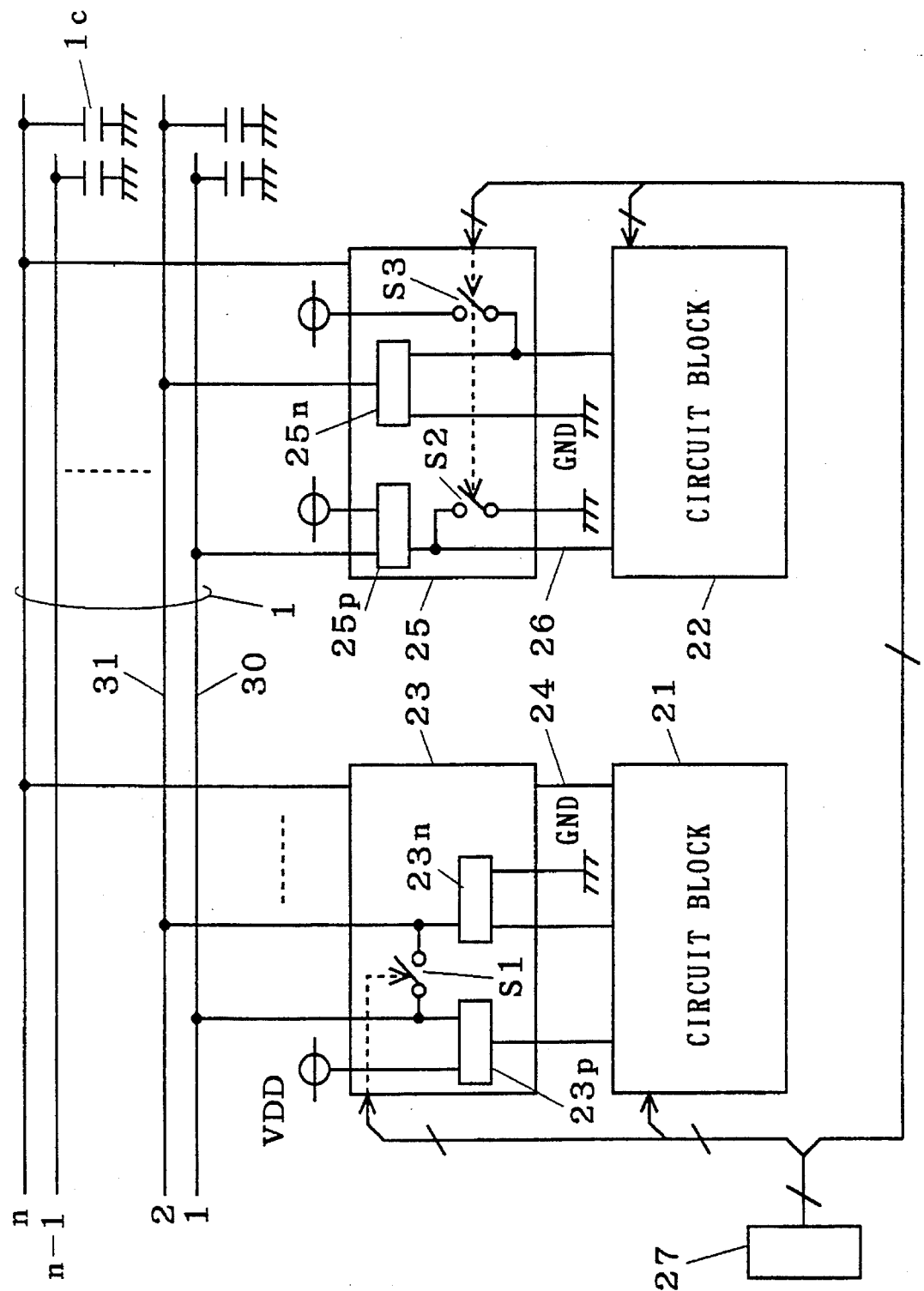
FIG. 1 is a block diagram showing the constitution of a bus system of the invention.

First of all, the outline of a bus system to which first to fourth preferred embodiments of the invention is applied is described by referring to FIG. 1. FIG. 1 is a block diagram for explaining the outline of the bus system of the invention. In FIG. 1, reference numeral 1 is a bus for transmitting information of n bits by n data lines each having a parasitic capacity 1c, 21, 22 are circuit blocks of logic circuit, memory circuit, and the like, 23 is a bus drive circuit for driving the bus 1 depending on the output of the circuit block 21, 24 is an internal signal line for connecting the bus drive circuit 23 and circuit block 21, 25 is a receiver circuit for taking the information from the bus 1 into the circuit block 22, 26 is an internal signal line for connecting the receiver circuit 25 and circuit block 22, and 27 is a control circuit for controlling the circuit blocks 21, 22, bus drive circuit 23, and receiver circuit 25.

The bus drive circuit 23 is composed of at least one data line drive circuit 23p connected to a an odd-numbered data line of the bus 1, and at least one data line drive circuit 23n connected to a an even-numbered data line. The data line drive circuit 23p possesses a first terminal connected to a power source line for feeding a power source voltage VDD, a second terminal connected to an odd-numbered data line 30 or the like, and a control terminal connected to the internal signal line 24, and controls conduction and non-conduction between the first terminal and second terminal depending on the potential of the control terminal. The data line drive circuit 23n possesses a first terminal connected to a grounding line for feeding grounding potential GND, a second terminal connected to an even-numbered data line 31 or the like, and a control terminal connected to the internal signal line 24, and controls conduction and non-conduction between the first terminal and second terminal depending on the potential of the control terminal. Incidentally, the control terminals of the data line drive circuits 23p, 23n and the first and second terminals are insulated, or there may be a sufficient resistance between them so as not to cause potential drop of the data line. The circuit blocks 21, 22 may be constituent elements of the integrated circuit.

The receiver circuit 25 is composed of at least one data receiver 25p connected to an odd-numbered data line 30 or the like of the bus 1, and at least one data receiver 253n connected to an even-numbered data line 31 or the like. The data receiver 25p possesses a first terminal connected to a power source line for feeding power source voltage VDD, a second terminal connected to the internal signal line 26, and a control terminal connected to an odd-numbered data line of the bus 1, and controls conduction and non-conduction between the first terminal and second terminal depending on the potential of the control terminal. The data receiver 25n possesses a first terminal connected to a grounding line for feeding grounding voltage GND, a second terminal connected to the internal signal line 26, and a control terminal connected to an even-numbered data line of the bus 1, and controls conduction and non-conduction between the first terminal and second terminal depending on the potential of the control terminal. Incidentally, the control terminals of the data receivers 25p, 25n and the first and second terminals are insulated, or there may be a sufficient resistance between them so as not to cause malfunction due to potential drop of the data line.

Each data line of the bus 1 has a parasitic capacity 1c, and is connected to the grounding line through this parasitic capacity 1c, and each data line is in floating state unless it is connected to the power source line or grounding line through the bus drive circuit 23. Depending on whether the data line drive circuits 23p, 23n in the bus drive circuit have conducted between the first terminal and second terminal within the specified period or not, the information from the circuit block 21 is transmitted to the receiver circuit connected to the bus 1.

Besides, between the first and second data lines, third and four data lines, . . . , and (n–1)-th and n-th data lines of the bus 1, there are provided switches S1 for controlling on/off by the control signal from a control circuit 27. The switch S1 is intended to set each data line of the bus 1 to a specific potential between the grounding potential GND and power source potential VDD before the information of the circuit block 22 is outputted to the bus 1.

Figure 2:
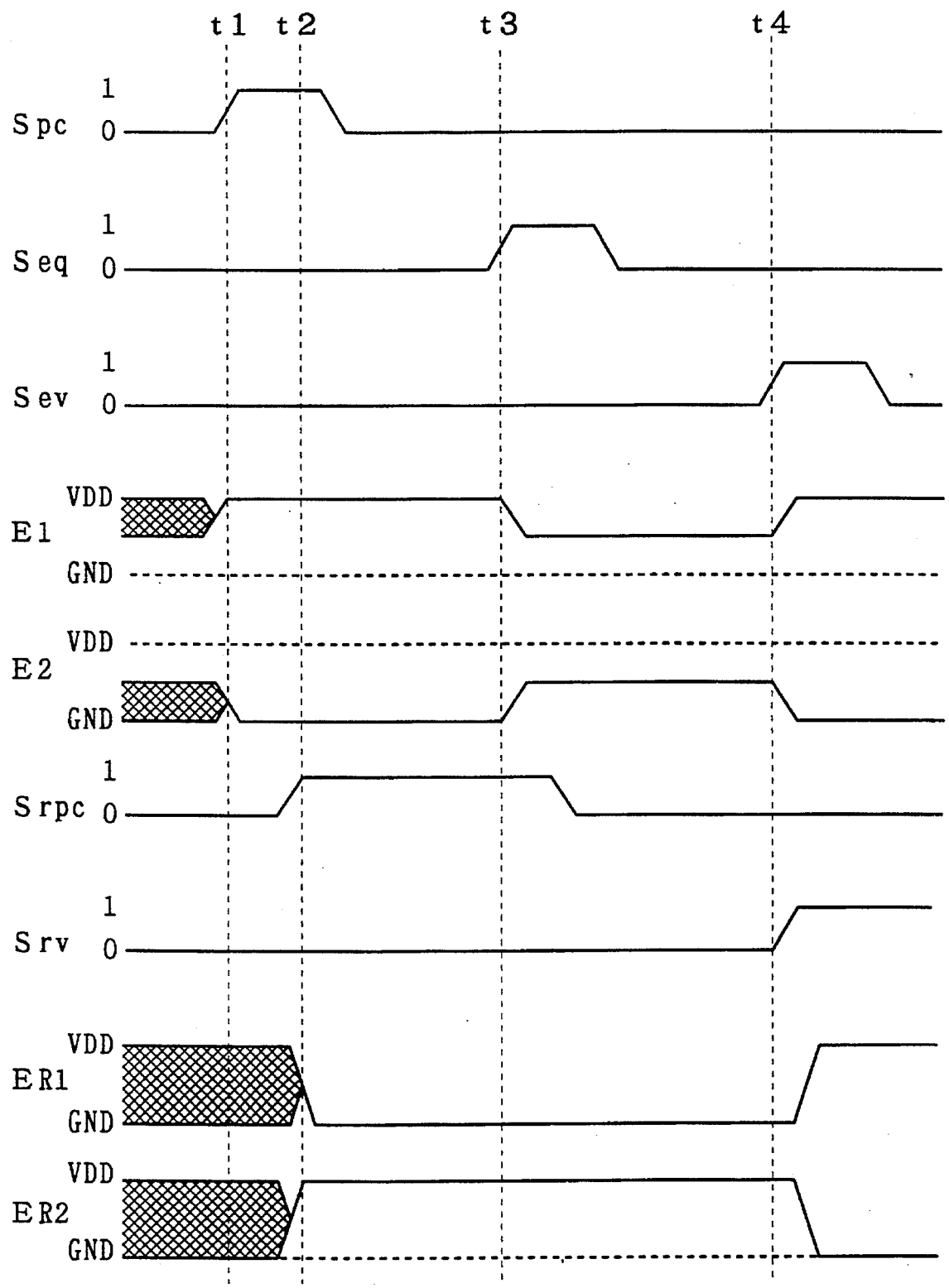
FIG. 2 is a timing chart for explaining the operation of the bus system shown in FIG. 1.

FIG. 2 is a timing chart showing the outline of the operation of the bus system shown in FIG. 1. At time t1, when a control signal Spc for transmitting a command for charging or discharging the data lines of the bus 1 is outputted from the control circuit 27, the odd-numbered data lines are charged in the data line driving circuits 23p of the bus drive circuit 23 to reach the power source potential VDD, while the even-numbered data lines are discharged in the data line drive circuits 23n of the bus drive circuit 23 to be the grounding potential GND. Later, at time 13, when the signal Seq for equalizing the potentials of the data lines of the bus 1 is outputted from the control circuit 27, the data lines of the bus 1 are set in floating state, and the switches S1 are closed, and all data lines of the bus 1 are set in specified potential. At time t4, when a control signal Sev outputted from the control circuit 27, conduction or non-conduction of the data line drive circuits 23p and data line drive circuits 23n is determined by the output signal from the circuit block 21, and whether conducting or not, the odd-numbered data lines of the bus 1 are set at the specified potential or power source potential, while the even-numbered data lines are set at the grounding potential or specified potential.

At the receiver circuit 25 side, meanwhile, when a control signal Srpc is outputted from the control circuit 27 at time t2, of the data lines in the internal signal lines 26, those connected to the odd-numbered data lines of the bus 1 are discharged from their parasitic capacities to the grounding potential GND by closing the switch S2. Of the data lines in the internal signal lines 26, those connected to the even-numbered data lines of the bus 1 have their parasitic capacities charged to the power source potential VDD by closing the switches S3.

Afterwards, when a control signal Srv is outputted from the control circuit 27, the receiver circuit 25 keeps the switches S2 open, and when the odd-numbered data lines of the bus 1 are at specific potential, each of the data receiver 25p connected to the odd-numbered data line of the bus 1 conducts between the first terminal and second terminal of the date receiver 25, and charges the internal signal line 26 connected to the second terminal of the data receiver 25p to the power source potential VDD. At this time, the receiver circuit 25 keeps the switches S2 open, and does not conduct between the first terminals and second terminals of the data receivers 25p when the odd-numbered data lines of the bus 1 are at the power source potential VDD, and holds the grounding potential GND in the internal signal lines 26.

At this time, when the even-numbered data lines of the bus 1 are at specified potential, with the switch S3 being open, the data receiver 25n connected to the even-numbered data lines of the bus 1 conduct between the first terminal and second terminal, and the data receiver 25n discharges the internal signal line 26 connected to the second terminal to the grounding potential GND. When the even-numbered data lines of the bus 1 are at the grounding potential GND, each of the data receiver 25p does not conduct between its first terminal and second terminal, and each of the data receiver 25n holds the power source potential VDD in the internal signal line 26.

Therefore, the signals transmitted through the odd-numbered data lines of the bus 1 swing between the specified potential and the power source potential VDD. The signals transmitted through the even-numbered data lines of the bus 1 swing between the specified potential and the grounding potential GND. Since the logical amplitude of the signals transmitted through the bus 1 is suppressed, the power consumption is kept low. Besides, it is not necessary to initialize, and the stand-by time can be extremely shortened. Besides, since only one data line of the bus 1 is needed for transmitting information of one bit, the number of data lines of the bus 1 does not increase.

FIG. 1 shows only one set of transmitter and receiver composed of the circuit block 21 for transmitting information and circuit block 22 for receiving information, but there may be plural sets of transmitter and plural sets of receiver connected to one bus. Or one circuit block may comprises a bus drive circuit and a receiver circuit. One circuit block may have plural bus drive circuits. It is, meanwhile, not necessary to drive all data lines of the bus by one bus drive circuit of the circuit block, and it may be constituted to drive only necessary ones. Similarly, one receiver circuit of the circuit block may not receive information from all data lines, but it may be connected to only necessary data lines so as to receive information only from necessary data lines of the bus 1. The data lines driven by the data line drive circuits 23p, 23n are not limited to the odd-numbered position and even-numbered position.

Preferred embodiment 1

Figure 3:
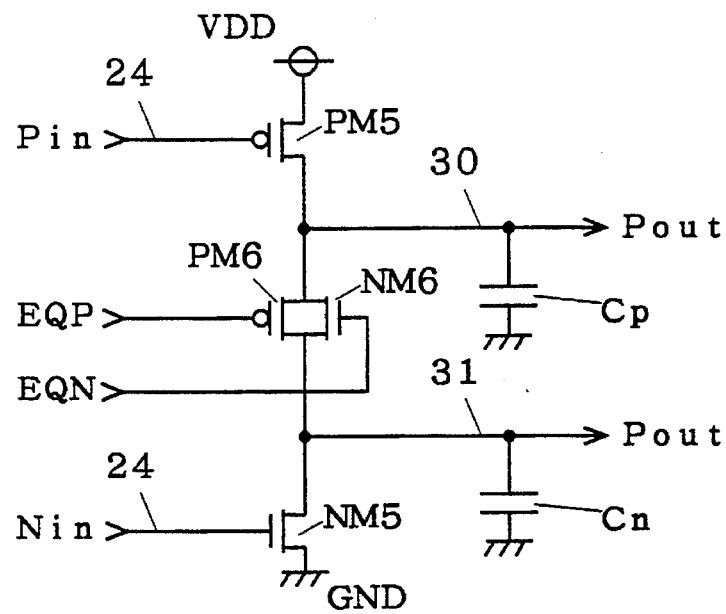
FIG. 3 is a circuit diagram showing the constitution of a bus drive circuit of a bus system of a first preferred embodiment of the invention.

The bus system according to a first preferred embodiment of the invention is described while referring to FIG. 3 to FIG. 6. FIG. 3 is a circuit diagram showing the constitution of a bus drive circuit according to the first preferred embodiment of the invention. In FIG. 3, reference numerals 30, 31 are data lines of the bus, PM5 is a P channel MOS transistor having a gate for receiving an input signal Pin being connected to the internal signal line 24, a source connected to the power source line for feeding power source potential VDD, and a drain connected to a data line 30 of the bus, NM5 is an N channel MOS transistor having a gate for receiving an input signal Nin being connected to the internal signal line 24, a source connected to the power source line for feeding grounding potential GND, and a drain connected to a data line 31 of the bus, PM6 is a P channel MOS transistor having a gate for receiving an equalizing signal EQP, one electrode connected to the data line 30 of the bus, and other electrode connected to the data line 31 of the bus, and NM6 is an N channel MOS transistor having a gate for receiving an equalizing signal EQN, one electrode connected to the data line 30 of the bus, and other electrode connected to the data line 31 of the bus, and Cp and Cn are parasitic capacities of the data lines 30, 31. The equalizing signals EQP, EQN given to the P channel MOS transistor PM6 and N channel MOS transistor NM6 are in a mutually complementary relation, and the two transistors act alike.

Figure 4:
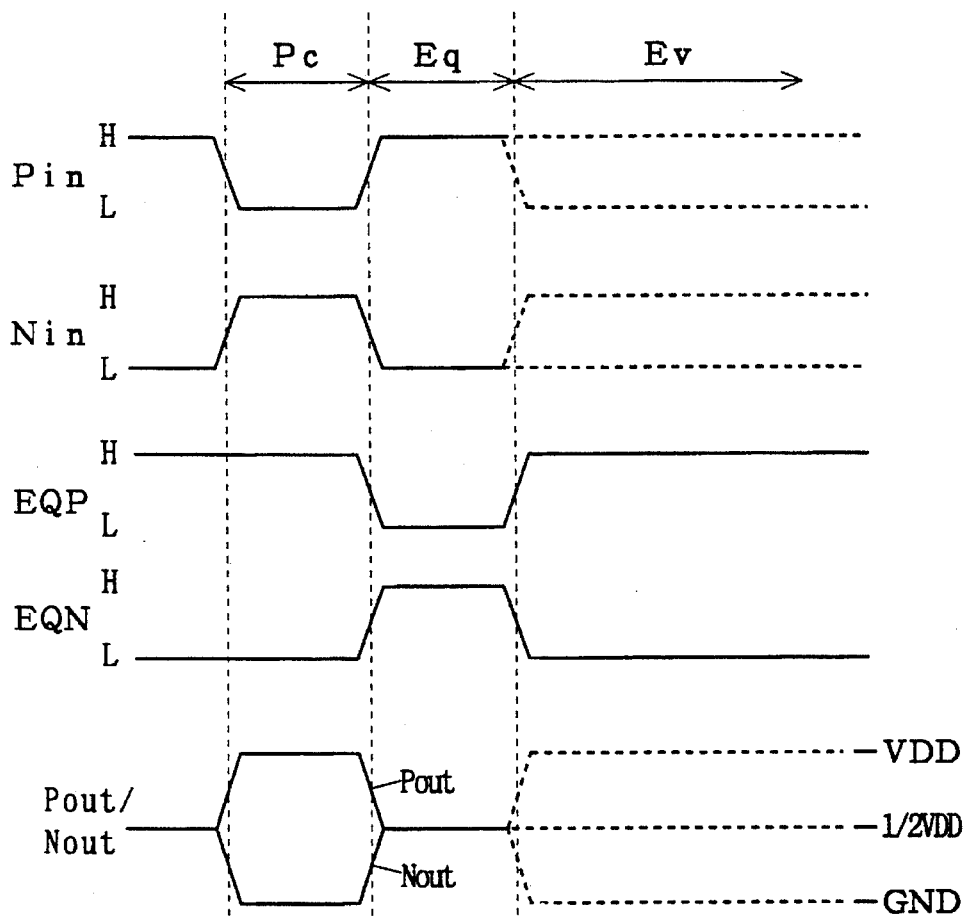
FIG. 4 is a timing chart for showing the operation of the bus drive circuit shown in FIG. 3.

Referring now to FIG. 4, the operation of the bus drive circuit shown in FIG. 3 is described. FIG. 4 is a timing chart showing the operation of the bus drive circuit, and the axis of ordinates of the timing chart represents the potential, and the axis of abscissas denotes the time. In the description of the operation of the bus drive circuit, the high level of input and equalizing signal corresponds to the power source potential VDD, and the low level corresponds to the grounding potential GND. One cycle of the bus drive circuit operation consists of three periods, that is, precharge period Pc, equalizing period Eq, and data transfer period Ev.

In the precharge period Pc, the input signal Pin is at low level and the input signal Nin is at high level. At this time, the P channel MOS transistor PM5 and N channel MOS transistor NM5 conduct. Accordingly, the data line 30 of the bus is charged, and the output signal Pout becomes high level, and the data line 31 is discharged, and the output signal Nout becomes low level. In this period, in order that the transistors PM6 and NM6 for equalizing may not conduct, the equalizing signal EPQ is set at high level and the equalizing signal EQN is at low level.

In the next equalizing period Eq, the equalizing signal EQP is at low level and the equalizing signal EQN is at high level, and the transistors PM6 and NM6 conduct. The input signal Pin is set at high level and input signal Nin at low level, and the transistors PM5 and NM5 do not conduct. At this time, electric charge is not supplied from the power source to the data lines 30, 31, and the electric charge does not flow into the ground, and hence the potential Vout of the data line may be expressed in formula 1 in terms of parasitic capacities Cp, Cn.

$$(Cp+Cn) \cdot Vout = Cp \cdot VDD \quad Vout = Cp \cdot VDD/(Cp+Cn)$$ [Formula 1]

When the values of parasitic capacities are equal, it is known from formula 1 that the potential of the data lines 30, 31 is VDD/2. The capacities Cp, Cn of the data lines 30, 31 are the sum of the wiring capacities of the data lines 30,31 and the capacities of the MOS transistors connected to the data lines 30, 31. The MOS transistors connected to the data lines of the bus comprise at least the transistor at the bus drive circuit side and the transistor at the receiver circuit side. The values of the parasitic capacities Cp, Cn of the adjacent data lines 30, 31 may be nearly equalized by equalizing the wiring length and adjusting the transistor size connected to the data lines.

In the final data transfer period Ev, data to be transferred are respectively given to input signals Pin, Nin. When the input signal Pin is at high level, the transistor PM5 maintains the non-conductive state, and the parasitic capacity Cp of the data line 30 holds the electric charge in the equalizing period Ep, so that the o output Pout becomes VDD/2. When the input signal Pin is at low level, the transistor PM5 conducts, the power source potential VDD is supplied from the power source line into the parasitic capacity Cp of the data line 30, and hence the potential of the data line 30 climbs up, and the output signal Pout becomes VDD.

Similarly, when the input signal Nin is at low level, the transistor NM5 maintains the non-conductive state, and the parasitic capacity Cn of the data line 31 holds the electric charge in the equalizing period Eq, so that the potential of the output signal Nout becomes VDD/.2. When the input signal Nin is at high level, the transistor NM5 conducts, discharging from the parasitic capacity Cn of the data line 31 into the grounding line, so that the output signal Pout becomes GND. At the receiver circuit side for receiving the data, by sensing the potential of the data lines 30, 31 in this period, data transfer is enabled.

Figure 16:
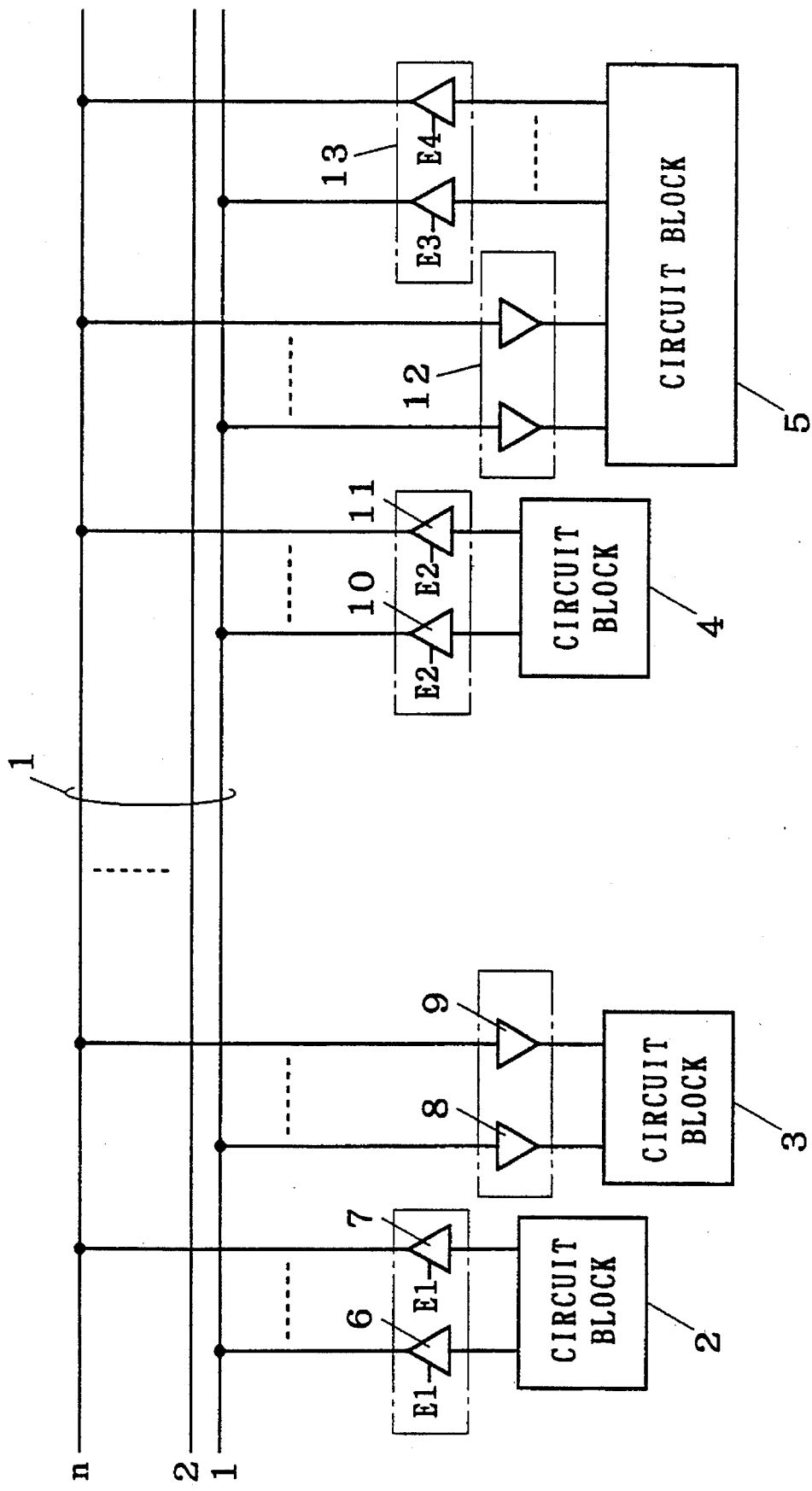
FIG. 16 is a block diagram showing an example of constitution of a conventional bus system.
Figure 17A:
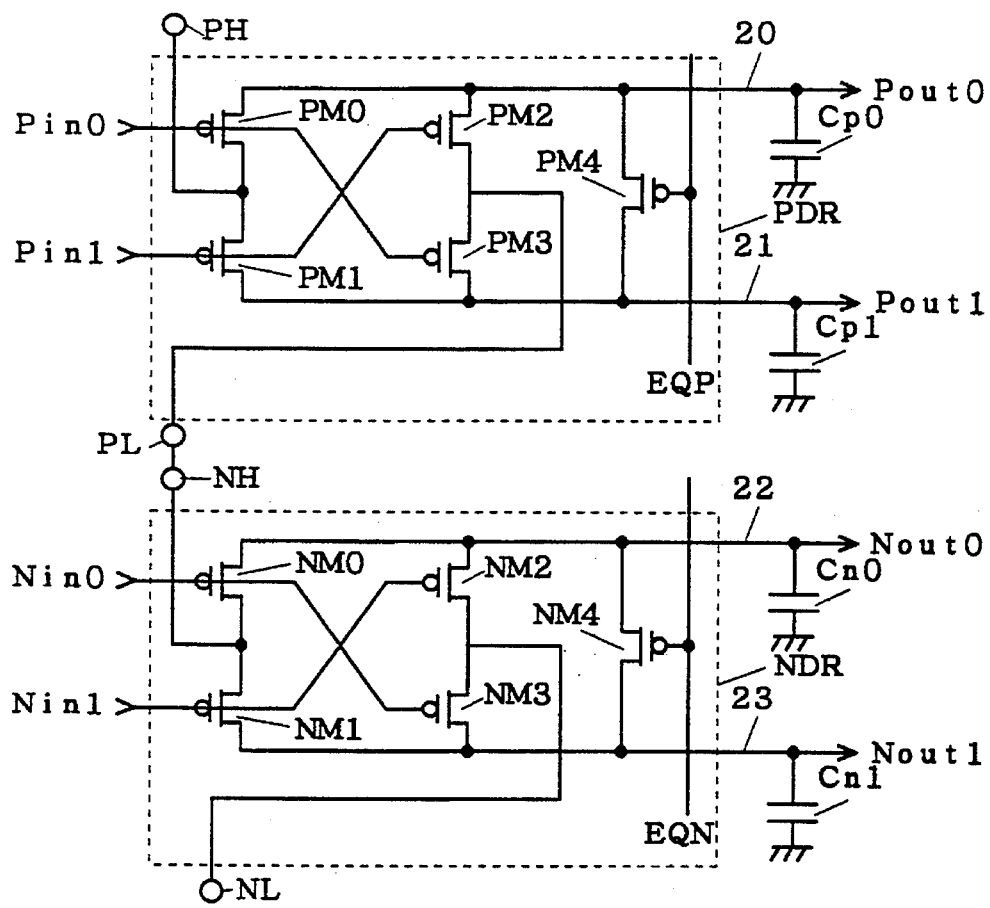
FIG. 17A and FIG. 17B are circuit diagrams showing examples of constitution of conventional bus drive circuits.
Figure 17B:
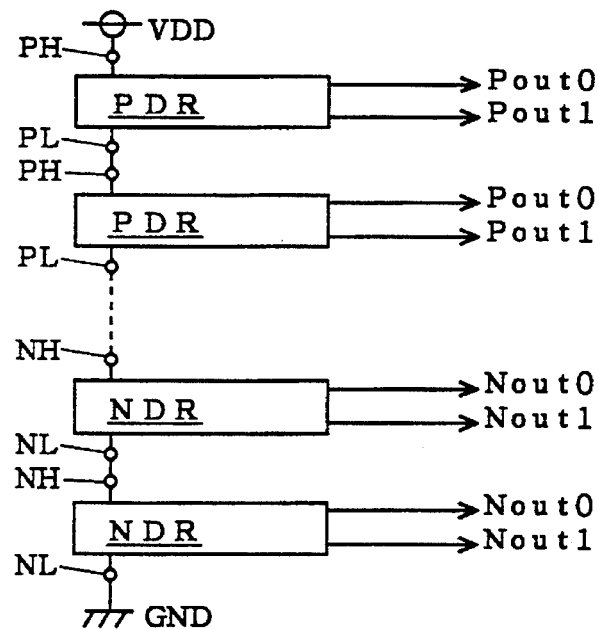
Figure 18:
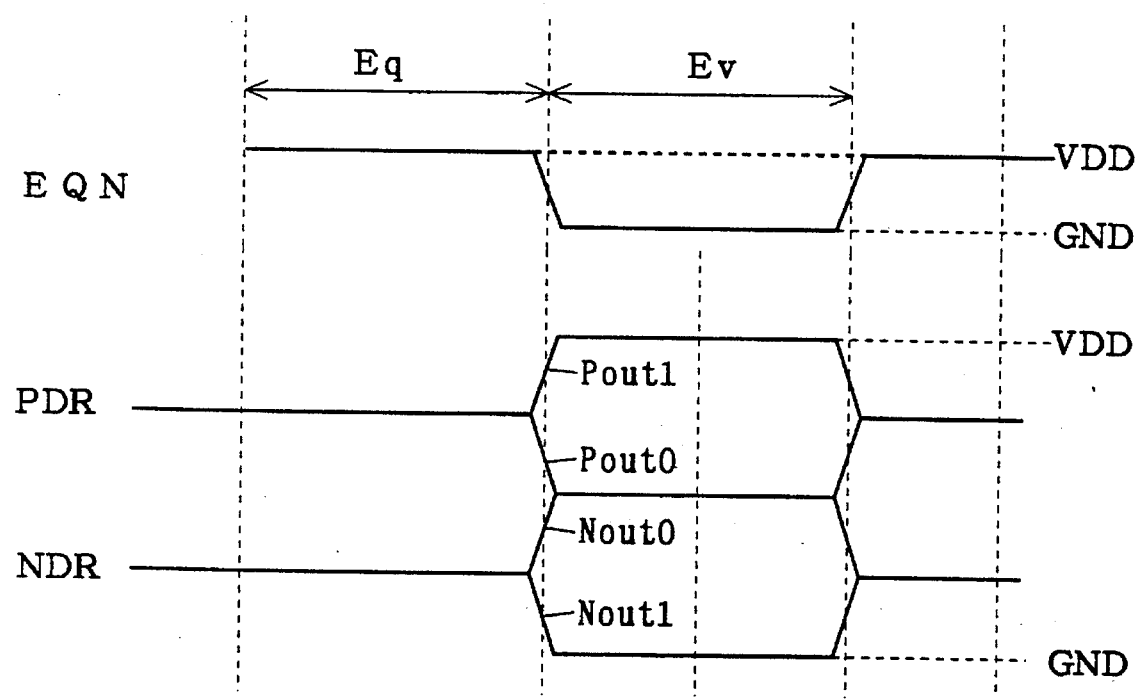
FIG. 18 is a timing chart for explaining the operation of the bus drive system shown in FIG. 17A.

In this way, concerning the output signal Pout, the low side logical level (low level) is VDD/2, the high side logic level (high level) is VDD, and concerning the output signal Nout, the low side logical level is GND, and the high level is VDD/2. Therefore, the logical amplitude of each data line of the bus is VDD/2, which is half of the amplitude between the power source potential VDD and grounding potential GND, and the current consumption is also decreased to about half. Each data line is not required to be complementary signal, and it is not necessary to increase twice the number of data lines as in the method shown in FIG. 17A and FIG. 17B. In each data line, moreover, since the potential is fixed at VDD or GND level in the precharge period Pc, there is no period of unstable potential as in the conventional bus systems shown in FIG. 17A and FIG. 17B, and extra time for initialization is not needed. Moreover, for increase of bus width, the driving circuits are not stacked up in series, structurally, and there is no body effect, and the output line is driven at high speed. Still more, in the conventional bus drive circuit shown in FIG. 17A, five transistors are needed for one bus drive circuit, but in the bus drive circuit shown in FIG. 3, it can be composed of four transistors, and hence the number of elements is also curtailed. Thus, the bus drive circuit in the first preferred embodiment is superior in the aspect of current consumption as compared with the bus drive circuit having logical amplitude of (VDD–GND) as shown in FIG. 16, and hence as compared with the bus drive circuits shown in FIG. 17A and FIG. 17B, it is superior in the aspects of area, speed, and number of constituent elements.

Figure 5:
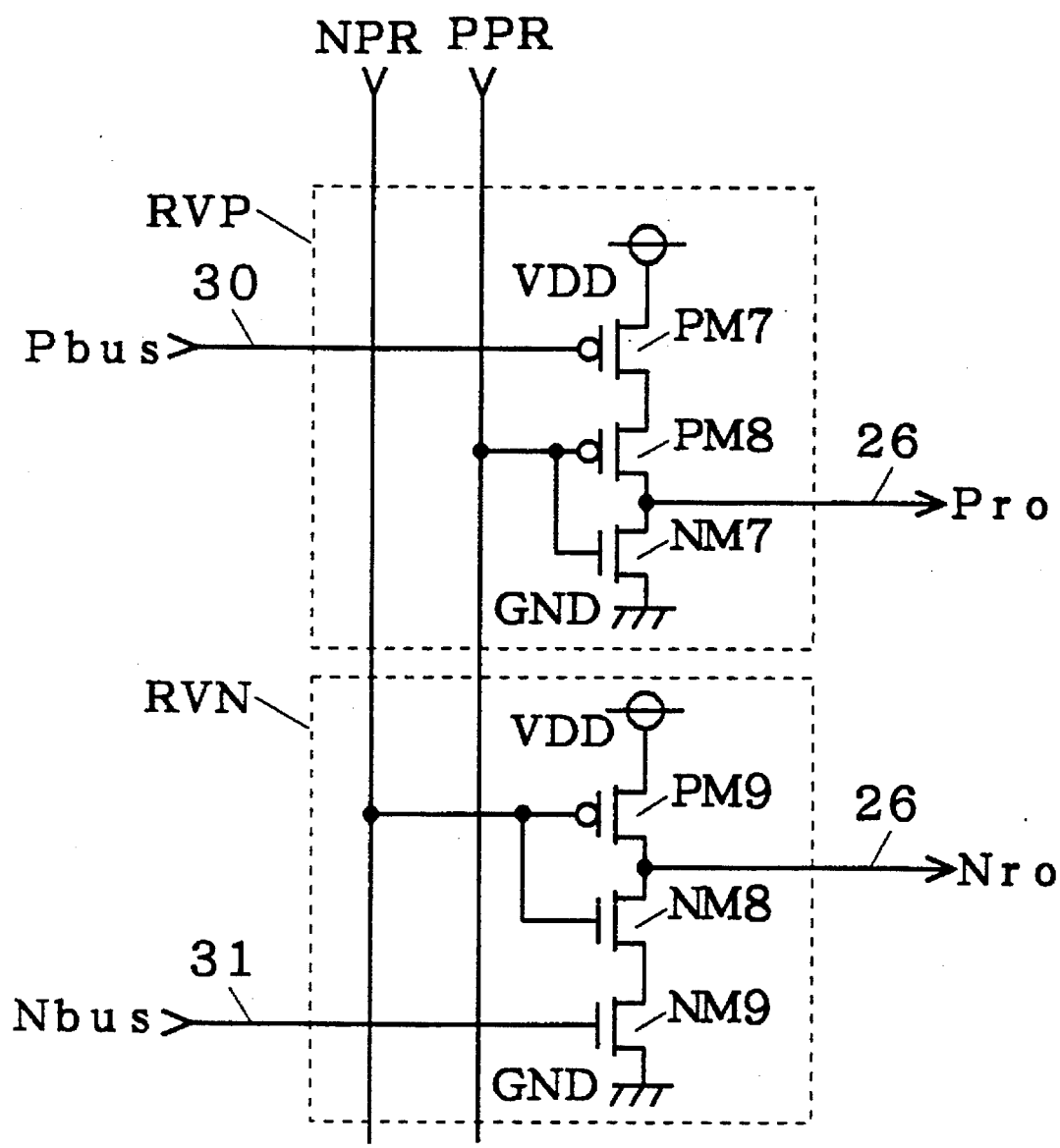
FIG. 5 is a circuit diagram showing the constitution of a receiver circuit of the bus system of the first preferred embodiment of the invention.

The receiver circuit of the bus system of the first preferred embodiment is described below. FIG. 5 is a circuit diagram showing the constitution of the receiver circuit in the first preferred embodiment. In FIG. 5, RVP is a data receiver for receiving information from a data line 30 driven by the P channel MOS transistor, and RVN is similarly a data receiver for receiving information from a data line 31 driven by the N channel MOS transistor, Pbus and Nbus are signals given from the data lines 30, 31, that is, input signals of the data receivers RVP and RVN. The signal Pbus corresponds to the output Pout of the data line drive circuit 23p in FIG. 1, and the signal Nbus similarly corresponds to the output signal Nout of the data line drive circuit 23n. The data receiver RVP is constituted by series connection of P channel MOS transistors PM7, PM8 and N channel MOS transistor NM7 connected between the power source line and grounding line. The gate of the P channel MOS transistor PM7 is connected to the data line 30, and its source is connected to the power source line. The source of the P channel MOS transistor PM8 is connected to the drain of the P channel MOS transistor PM7, its drain is connected to the internal signal line 26, and its gate receives precharge signal PPR. The source of the N channel MOS transistor NM7 is connected to the grounding line, its drain is connected to the internal signal line 26, and its gate receives precharge signal PPR. The data receiver RVN is composed of P channel MOS transistor PM9 and N channel MOS transistors NM8, NM9 connected in series between the power source line and grounding line. The source of the P channel MOS transistor PM9 is connected to the power source line, its drain is connected to the internal signal line 26, and its gate receives precharge signal NPR. The drain of the N channel MOS transistor NM8 is connected to the internal signal line 26, and its gate receives precharge signal NPR. The source of the N channel MOS transistor NM9 is connected to the grounding line, its drain is connected to the source of the N channel MOS transistor NM8, and its gate receives input signal Nbus. The data receiver RVP outputs an output signal Pro to the internal signal line, and the data receiver RVN outputs an output signal Nro to the internal signal line 26.

Figure 6:
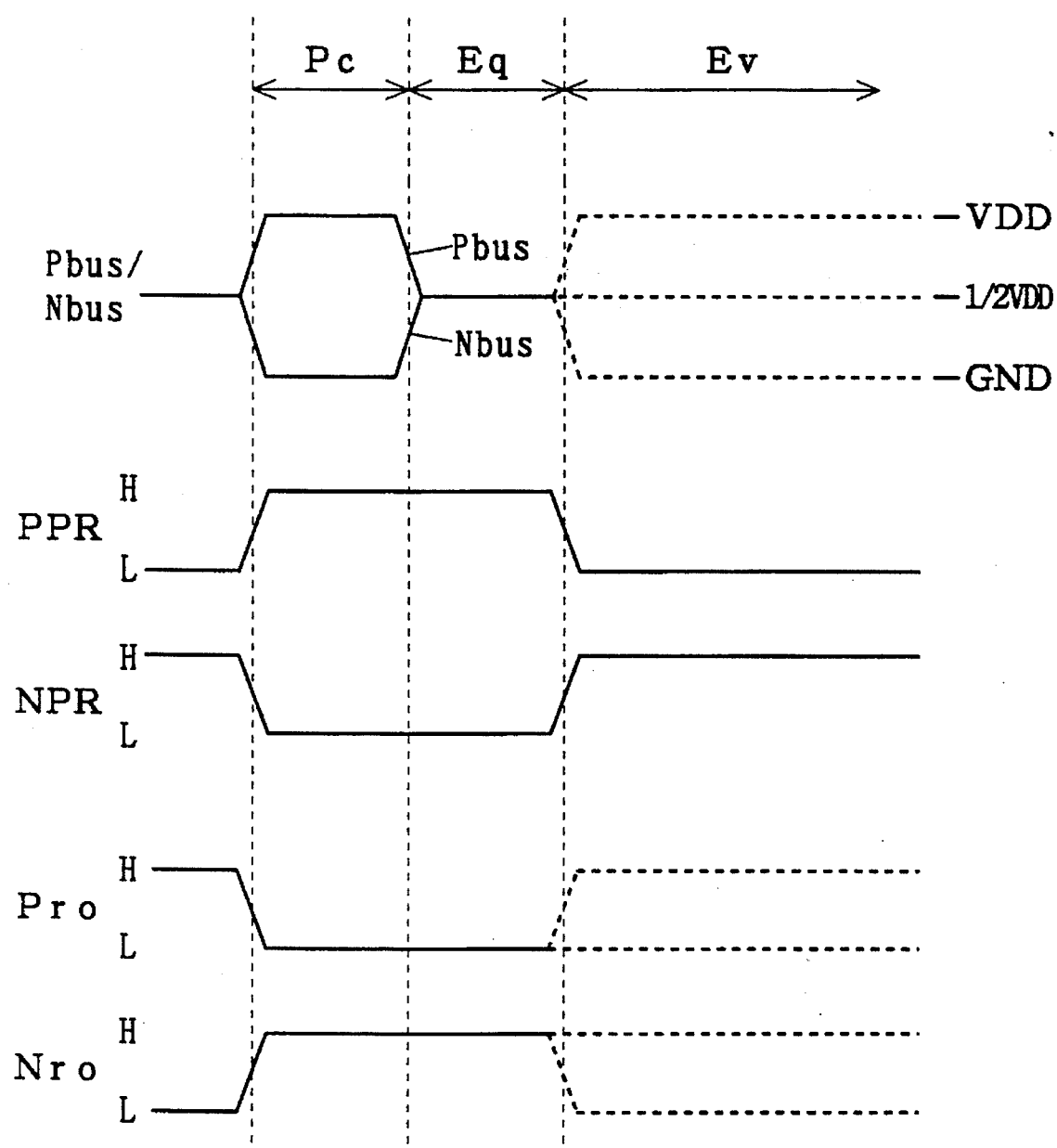
FIG. 6 is a timing chart showing the operation of the receiver circuit shown in FIG. 5.

The operation of the receiver circuit shown in FIG. 5 is explained by referring to the timing chart shown in FIG. 6. To clarify the correlation with the operation of the bus drive circuit, FIG. 6 shows precharge period Pc, equalizing period Eq, and data transfer period Ev of the drive circuit.

During the precharge period Pc and equalizing period Eq of the bus drive circuit, the receiver circuit precharges. In this period, the precharge signal PPR is at high level, and the precharge signal NPR is at low level. At this time, the transistor PM8 is in non-conductive state, and the transistor NM8 conducts, and hence electric charge is discharged from the parasitic capacity of the internal signal line 26, and the output signal Pro comes to low level. At the same time, the transistor PM9 conducts, and the transistor NM8 is in non-conductive state, and the electric charge is accumulated in the parasitic capacity of the internal signal line 26, and the output signal Nro becomes high level.

In the next data transfer period Ev, the data to be transferred from the bus drive circuit to the data line is outputted. At this time, the precharge signal PPR is at low level, and the precharge signal NPR is at high level. As already explained, the signal Pbus possesses two logical levels, VDD as high level and VDD/2 as low level. Likewise, the signal Nbus has VDD/2 as high level and GND as low level.

When the signal Pbus is VDD, the P channel MOS transistor PM7 does not conduct, and the output signal Pro remains at GND. To the contrary, when the output signal Pbus is VDD/2, the transistor PM7 conducts, and the output signal Pro becomes high level.

When the signal Nbus is GND, the N channel MOS transistor NM9 does not conduct, and the output signal Nro remains at VDD. When the signal Nbus is VDD/2, the N channel MOS transistor NM9 conducts, and the output signal Nro becomes low level. When the input signals Pbus, Nbus of the data receiver are at VDD/2, in order that the transistors PM7 and PM9 may conduct, the absolute value of the threshold voltage Vth of these transistors must satisfy the following condition.

$$|Vth| < \frac{VDD}{2} \quad \text{[Formula 2]}$$

When the gate length is 0.5 μm, generally |Vth| is 0.8 V or less, and the transistor operates normally when VDD is 1.6 V or more. In the equalizing period of the bus drive circuit, the input signal Pbus and Nbus to the data receiver are VDD/2, and hence the input transistors PM7 and NM9 conduct. At the same time, this period is also the precharge period of the receiver circuit, and the transistors NM7 and PM9 for precharge also conduct. The P channel MOS transistor PM8 and N channel MOS transistor NM8 are provided in order not to connect between the transistor PM7 and transistor NM7, and between the transistor PM9 and transistor NM9 of the data receivers RVP, RVN. In the precharge period, the transistors PM8 and NM8 are is non-conductive state, and the transistors PM8, NM8 separate the transistors PM7, NM9 from the internal signal line 26.

This receiver circuit does not require complementary signal, and hence the number of constituent elements is curtailed. In the data transfer period, the output end (internal signal line 26) of the receiver circuit is at high impedance, if the transistors PM7, NM9 conduct only slightly, the potential varies quickly, so that fast operation is enabled.

Preferred embodiment 2

The bus system according to a second preferred embodiment of the invention is described while referring to FIG. 7 to FIG. 10. In the bus system of the first preferred embodiment, the data line drive circuits are directly connected to the internal signal line 24, it is limited so that the signals Pin, Nin provided from the circuit block to the bus drive circuit may output specific signals individually in the precharge period Pc, equalizing period Eq, and data transfer period Ev, but in the bus drive circuit of the second preferred embodiment, the outputs from the circuit blocks are not limited, but a converting circuit for changing the input signal to the bus drive circuit depending on the stage of transmission in the bus is provided before the bus drive circuit, so that the output of the circuit block and the signal transmitted in the bus are matched.

Figure 7:
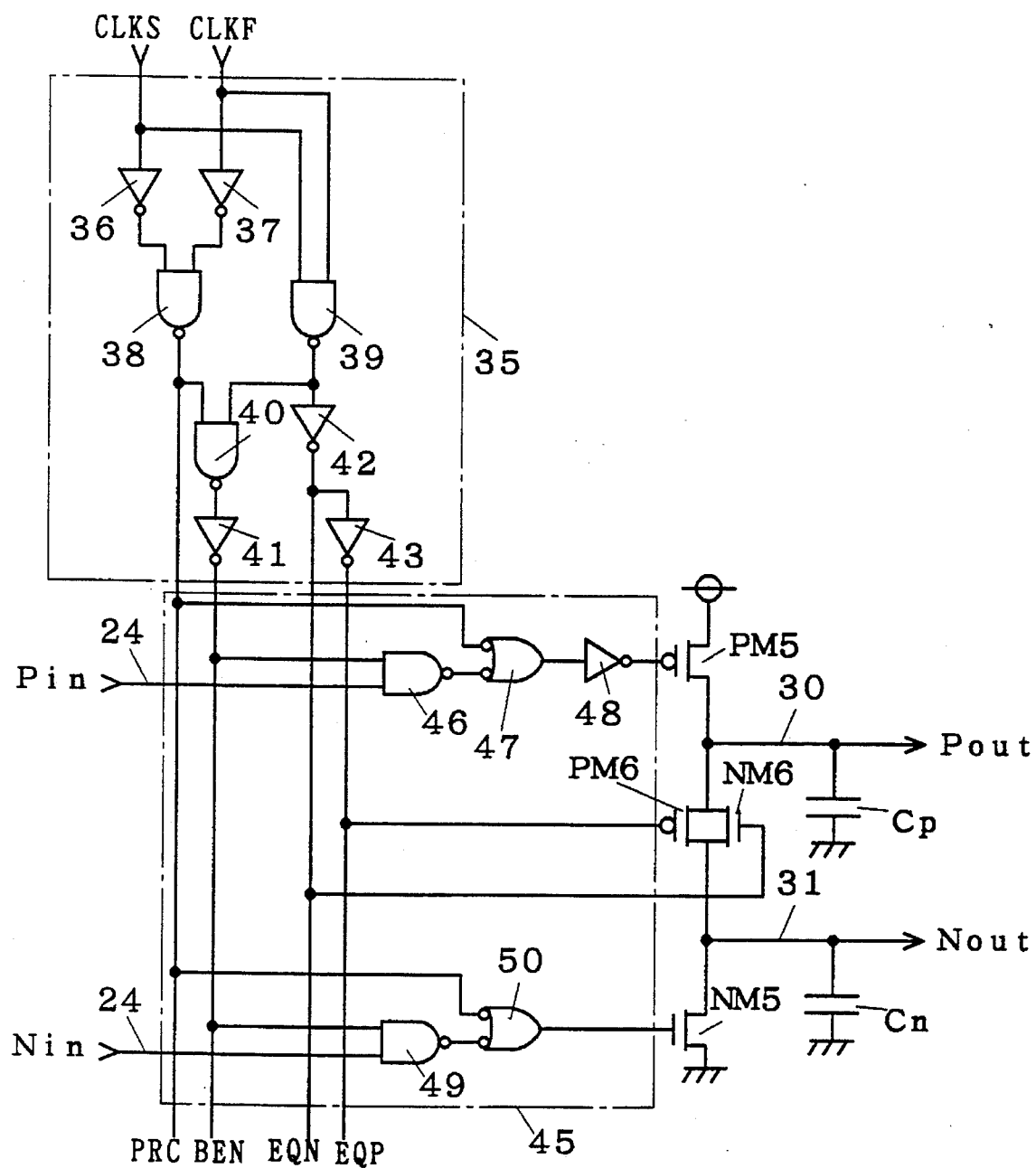
FIG. 7 is a circuit diagram showing the constitution of a bus drive circuit of a bus system of a second preferred embodiment of the invention and its control circuit.
Figure 8:
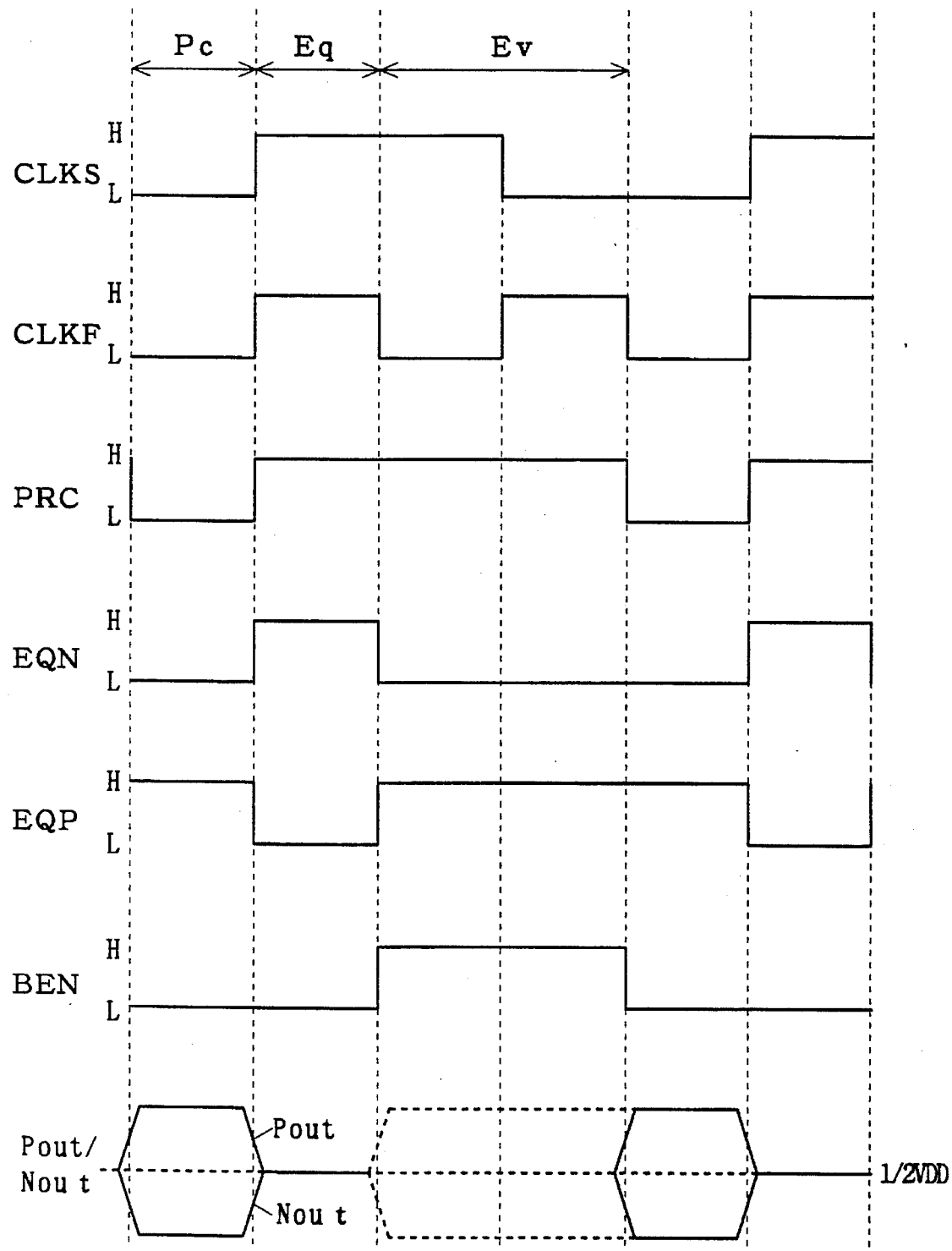
FIG. 8 is a timing chart showing the operation of the bus drive circuit and its control circuit shown in FIG. 7.

In the control circuit shown in FIG. 7, two kinds of clock signals CLKS and CLKF are used for controlling the bus drive circuit. The frequency of CLKF is set two times that of CLKS. The rise of these clocks is matched at either. FIG. 8 shows the timing chart of the control signals. In FIG. 7, reference numeral 35 denotes a control circuit for generating a control signal for controlling the bus drive circuit on the basis of two types of clocks CLKS, CLKF, 45 is a converting circuit for converting signals according to the transmission system of the bus by receiving the control signal of the control circuit 35 and input signals Pin, Nin inputted into the bus drive circuit from the circuit block, and other reference numerals same as in FIG. 3 are corresponding parts in FIG. 3. The control circuit 35 comprises an inverter 36 for inverting the clock CLKS, an inverter 37 for inverting the clock CLKF, a NAND gate 38 for outputting a NAND of the inverters 36, 37, a NAND gate 39 for outputting a non-conjunction of the clock CLKS and clock CLKF, a NAND gate 40 for outputting a non-conjunction of the NAND gates 38, 39, an inverter 41 for inverting the output of the NAND gate 40, an inverter 42 for inverting the output of the NAND gate 39, and an inverter 43 for inverting the output of the inverter 42. The output of the NAND gate 38 is a precharge signal PRC, the output of the inverter 41 is an enable signal BEN, the output of the inverter 42 is an equalizing signal EQN, and the output of the inverter 43 is an equalizing signal EQP.

The converting circuit 45 comprises a NAND gate 46 for outputting a non-conjunction of input signal Pin and enable signal BEN, a NAND gate 47 for outputting a non-conjunction of the output of the NAND gate 46 and precharge signal PRC, an inverter 48 for inverting the output of the NAND gate 47, a NAND gate 49 for outputting a non-conjunction of input signal Nin and enable signal BEN, and a NAND gate 50 for outputting a non-conjunction of the output of the NAND gate 49 and precharge signal PRC.

Referring to FIG. 8, the operation of the circuit shown in FIG. 7 is described below. It is the precharge period Pc when the clocks CLKS, CLKF are both at low level. At this time, the precharge signal PRC is at low level, and the converting circuit 45 causes the PM5 and NM5 to conduct regardless of input signals Pin, Nin. Therefore, the output signal Pout is at the power source potential VDD, and the output signal Nout is at the grounding potential GND.

When the clocks CLKS, CLKF are both at high level, it is the equalizing period. The equalizing signal EQN is at high level and equalizing signal EQP is at low level, and the converting circuit 45 causes the P channel MOS transistor PM6 and N channel MOS transistor NM6 to conduct. As the transistors PM6, NM6 conduct, supposing the parasitic capacities Cp and Cn of the data lines 30, 31 to be equal to each other, as already explained, the potentials of the both data lines 30, 31 are identical, and the output signals Pout, Nout both become VDD/2.

Consequently, when the clock CLKS is at high level and the clock CLKF is at low level, or when the clock CLKS is at low level and the clock CLKF is at high level, the enable signal BEN is at high level, and it is the data transfer period Ev. At this time, the converting circuit 45 makes the input signals Pin, Nin valid. Before the enable signal BEN becomes high level, however, it is supposed that valid data are set at input signals Pin, Nin. The output signal Pout changes to high level (VDD) or low level (VDD/2) depending on the input signal Pin. Similarly, the output signal Nout changes to high level (VDD/2) or low level (GDN) depending on the input signal Nin.

Regardless of the input signals Pin, Nin, the data line drive circuit operates appropriately in the precharge period Pc and equalizing period Eq according to the control signals PCR, BEN, EQN, EQP, and therefore the circuit block is not required to have the input signals Pin, Nin formatted according to the precharge period, equalizing period, and data transfer period, and the regulation of the circuit block is relaxed and the application is extended, so that the versatility of the bus system is widened.

Figure 9:
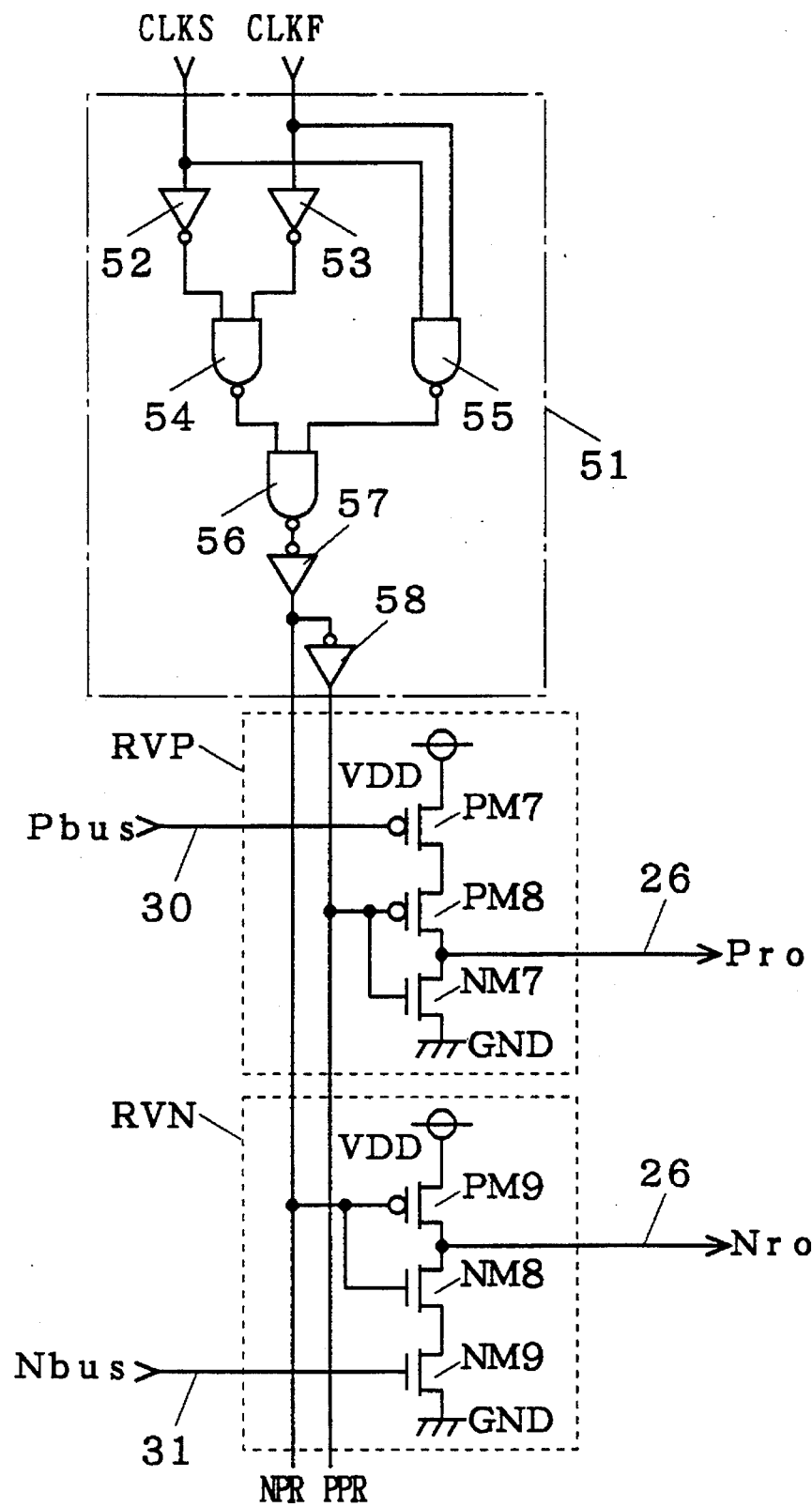
FIG. 9 is a circuit diagram showing the constitution of a receiver circuit of the bus system of the second preferred embodiment of the invention.
Figure 10:
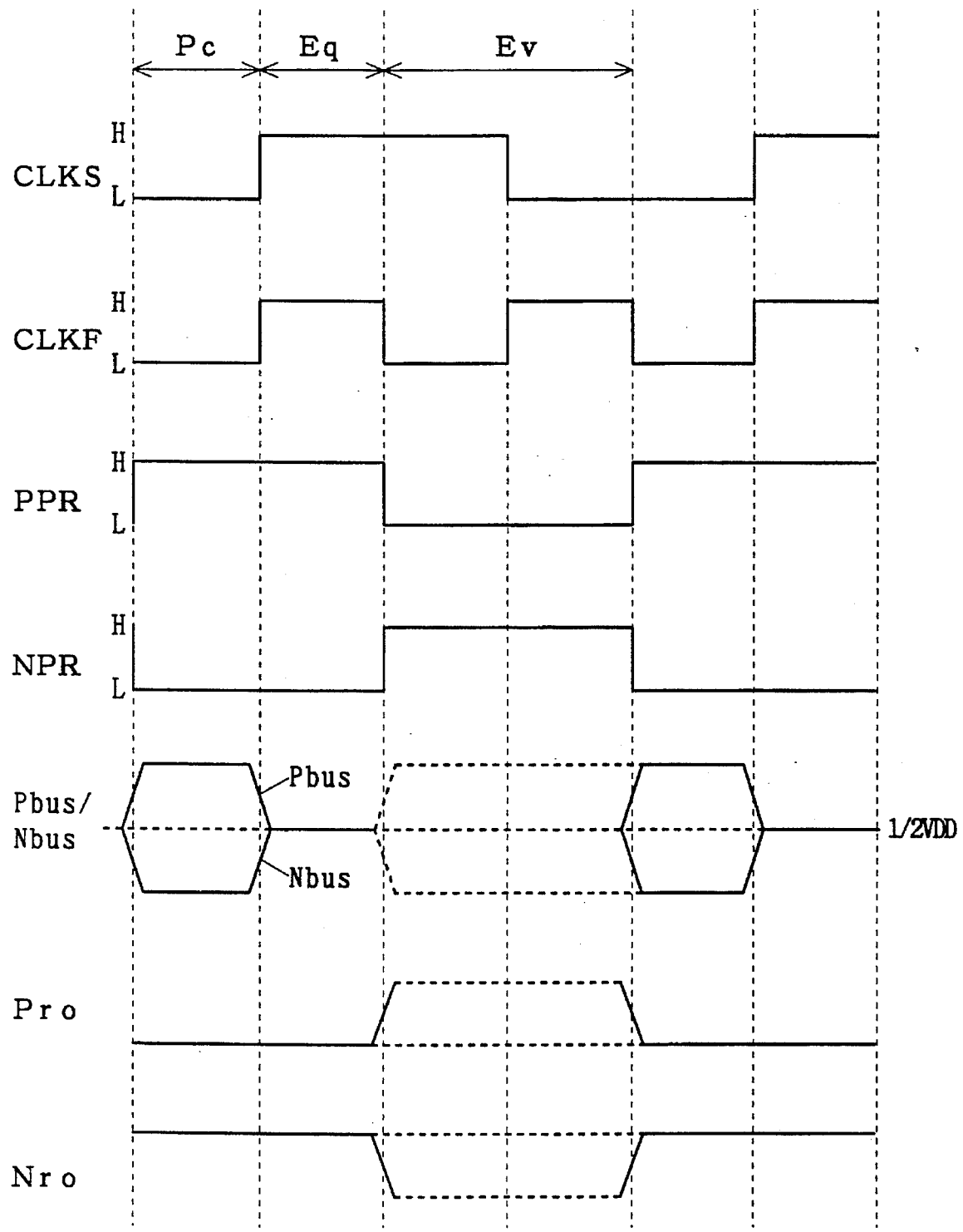
FIG. 10 is a timing chart showing the operation of the bus drive circuit and its control circuit shown in FIG. 9.

In the bus system of the second preferred embodiment, the receiver circuit and its control circuit are described while referring to FIG. 9 and FIG. 10. Same as in the bus drive circuit, two types of clocks CLKS, CLKF are used for generating a control signal for controlling the receiver circuit. The frequency of the clock CLKF is set two times that of the clock CLKS. FIG. 10 shows the timing chart of control signals. In FIG. 10, in order to clarify the correlation with the operation of the drive circuit, the precharge period Pc, equalizing period Eq, and data transfer period Ev of the bus drive circuit are shown.

In FIG. 9, reference numeral 51 is a control circuit for generating precharge signals PPR, NPR for controlling the receiver circuit, and other reference numerals correspond to those in FIG. 5. The control circuit 51 comprises an inverter 52 for inverting the clock CLKS, an inverter 53 for inverting the clock CLKF, a NAND gate 54 for outputting a non-conjunction of the inverters 52, 53, a NAND gate 55 for outputting a non-conjunction of the clocks CLKS, CLKF, a NAND gate 56 for outputting a non-conjunction of the outputs of the NAND gates 54, 55, an inverter 57 for inverting the output of the NAND gate 56, and an inverter 58 for inverting the output of the inverter 57. The output of the inverter 57 is the precharge signal NPR, and the output of the inverter 58 is the precharge signal PPR.

The control circuit 51 sets the precharge signal PPR to high level, and precharge signal NPR to low level when the clocks CLKS, CLKF are identical. Receiving the precharge signals PPR, NPR from the control circuit 51, the data receivers RVP, RVN precharge. On the other hand, when the potential levels of the clocks CLKS, CLKF are mutually different, the control circuit 51 set the precharge signal PPR to low level, and precharge signal NPR to high level. This period is the data transfer period Ev when the bus drive circuit outputs data, and the receiver circuit generates output signals Pro and Nro depending on the input signals Pbus and Nbus.

In this way, control signals of the bus drive circuit and receiver circuit are generated by the clock CLKS and the clock CLKF having its double frequency, the precharge period can be easily set to ¼ period of the clock CLKS, the equalizing period to its ¼ period, and the data transfer period to its ½ period, and by setting the data transfer period relatively longer, there is an ample allowance in the timing at the circuit block side for receiving its signal, so that the circuit block may be easily designed.

Incidentally, the control circuit 27 shown in FIG. 1 includes the control circuit 35 and control circuit 51.

Preferred embodiment 3

In the receiver circuit used in the bus system of the first and second preferred embodiments, the circuit block which is directly connected to the internal signal line 26 and receives the signal from the internal signal line 26 could not taken in the data from the bus in other period than the data transfer period Ev. For example, in the receiver circuit in the first and second preferred embodiments, only half time of one cycle can be used in its output. In the bus system according to a third preferred embodiment, since a latch is provided in the output of the receiver circuit, the receiver circuit can hold its output throughout the whole period of each cycle, so that the circuit block can take in the data at any timing in each cycle.

Figure 11:
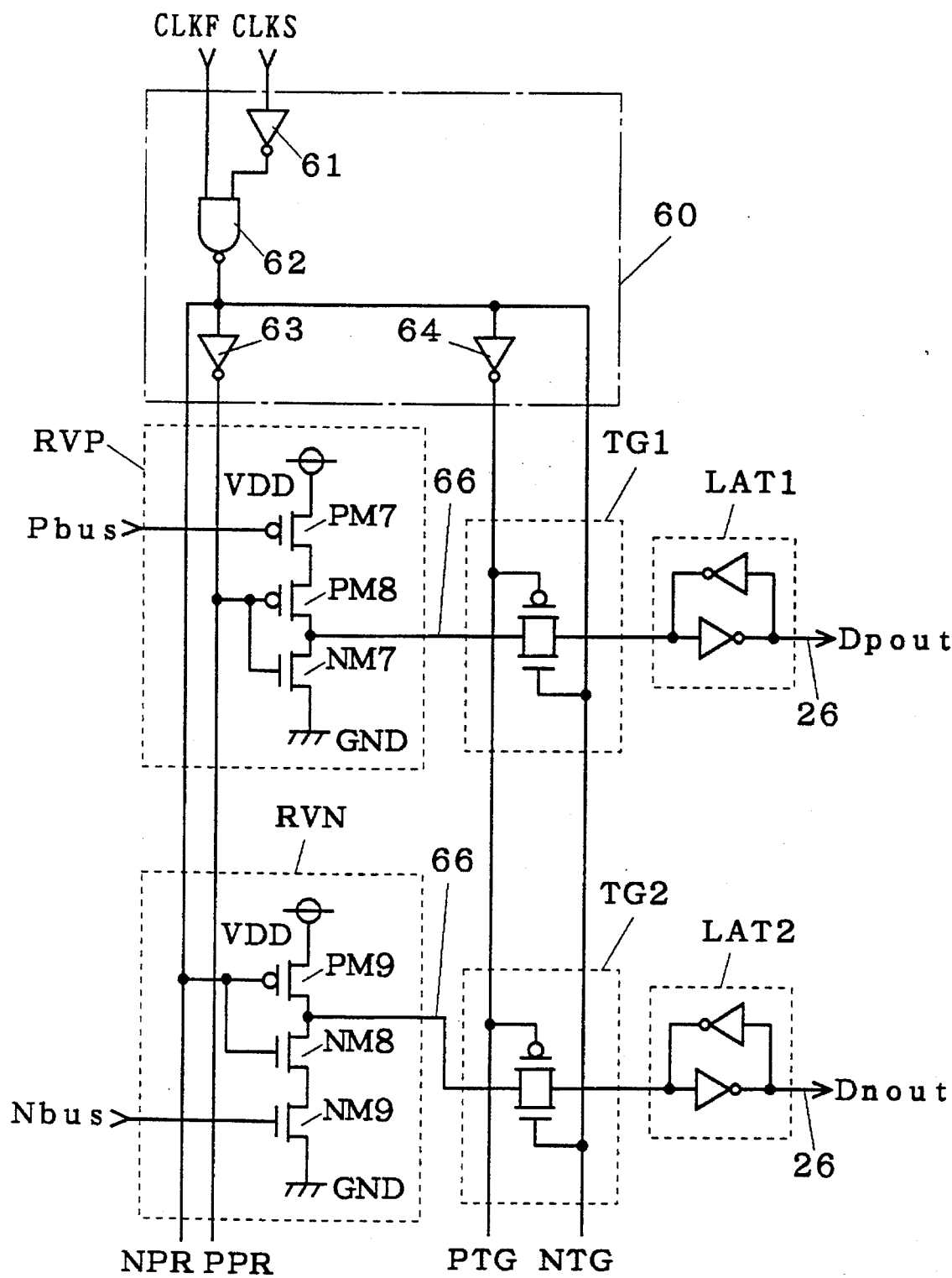
FIG. 11 is a circuit diagram showing the constitution of a receiver circuit of a bus system of a third preferred embodiment of the invention and its control circuit.

The constitution of the receiver circuit and its control circuit in the third preferred embodiment is shown in FIG. 11. In FIG. 11, TG1, TG2 are transfer gates for controlling the transmission of outputs of the data receivers RVP, RVN, 60 is a control circuit for outputting a signal for controlling the transfer gates TG1, TG2, while generating precharge signals PPR, NPR for controlling the receiver circuit, 66 are signal lines for connecting the data receiver RVP and transfer gate TG1, or data receiver RVN and transfer gate TG2, LAT1 is a latch circuit for holding the output of the data receiver RVP provided between the internal signal line 26 and transfer gate TG1, LAT2 is a latch circuit for holding the output of the data receiver RVN provided between the signal line 26 and transfer gate TG2, and other reference numerals correspond to those in FIG. 5.

The control circuit 60 comprises an inverter 61 for inverting the clock CLKS, a NAND gate 62 for outputting a non-conjunction of the clock CLKF and output of the inverter 61, an inverter 63 for inverting the output of the NAND gate 62, and an inverter 64 for inverting the output of the NAND gate 62. The output of the NAND gate 62 is a precharge signal NPr, the output of the inverter 63 is a precharge signal PPR, the output of the NAND gate 62 is a control signal NTG of the transfer gate, and the output of the inverter 64 is a control signal PTG of the transfer gate.

Figure 12:
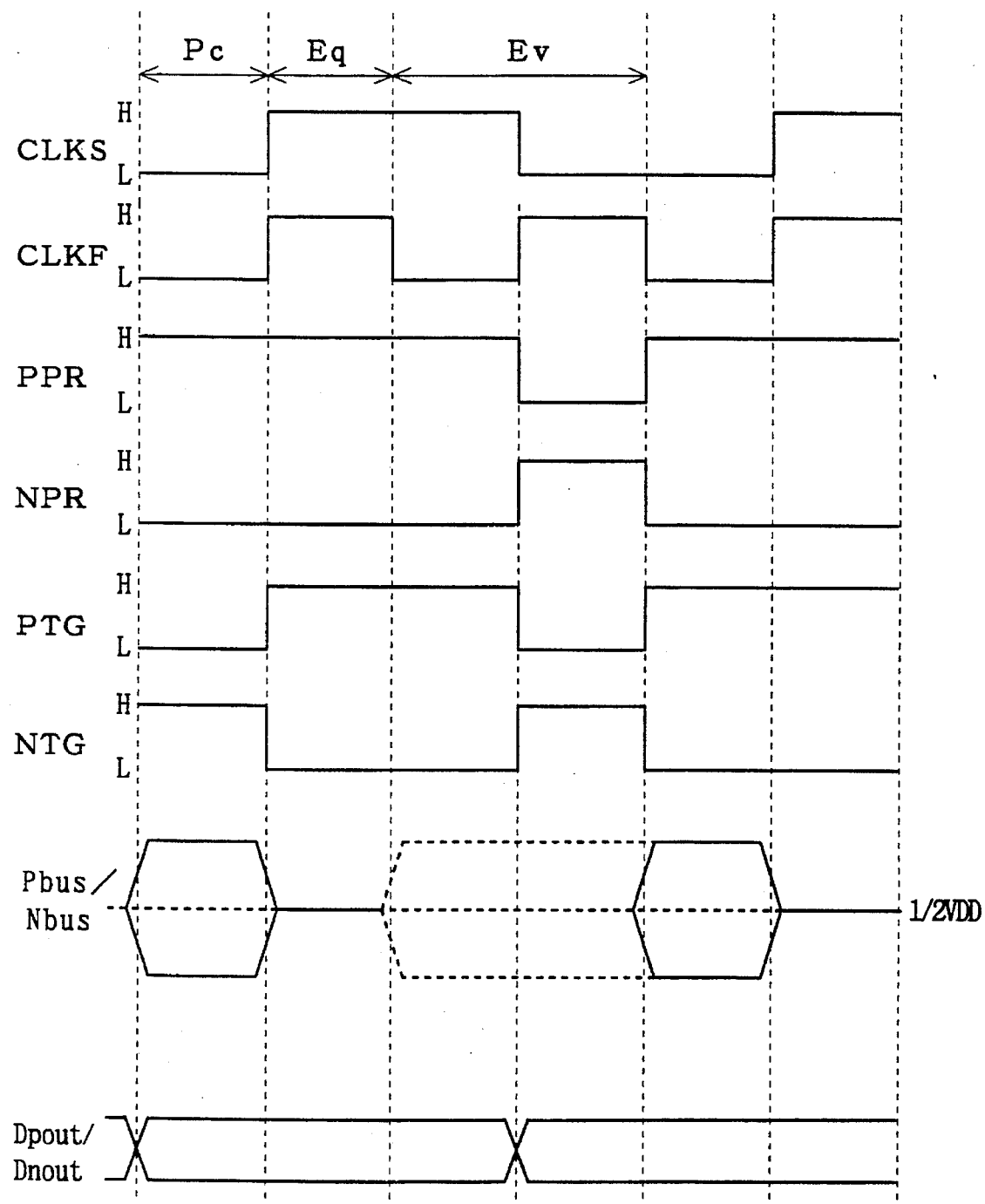
FIG. 12 is a timing chart showing the operation of the receiver circuit and its control circuit shown in FIG. 11.

FIG. 12 shows the timing chart of control signal outputted from the control circuit. In FIG. 12, to clarify the correlation with the operation of the drive circuit, the precharge period Pc, equalizing period Eq, and data transfer period Ev of the drive circuit are shown. For generation of control signal, two types of clocks CLKS, CLKF are used. The frequency of the clock CLKF is set two times that of the clock CLKS.

When the clock CLKS is at low level and the clock CLKF is at other than high level, the control circuit 60 sets the precharge signal PPR to high level, and precharge signal NPR to low level. At this time, the receiver circuit precharges. When the clock CLKS is at low level and the clock CLKF is at high level, the control circuit 60 sets the precharge signal PPR to low level, and precharge signal NPR to high level. At this time, the receiver circuit takes in the input signals Pbus, Nbus.

At the same time, the control signal PTG of the transmission gates TG1 and TG2 becomes low level and the NTG becomes high level, and the output of the receiver circuit is sent to the latch circuits LAT1 and LAT2.

Consequently, when the clock CLKS becomes low level and clock CLKF also low level the transmission gates TG1 and TG2 do not conduct, and the data in the latch circuits LAT1, LAT2 are held. That is, the data is taken in and latched in the latter half of the data transfer period Ev of the bus drive circuit. Accordingly, from the beginning of the next cycle of data transfer, that data can be used. In this preferred embodiment, the data take-in period of the receiver circuit is set in the period when the clock CLKS is at low level and clock CLKF is at high level, but using the same control circuit as in other preferred embodiments, the receiver data take-in period may be set in the entire data transfer period of the bus drive circuit.

Preferred embodiment 4

Figure 13:
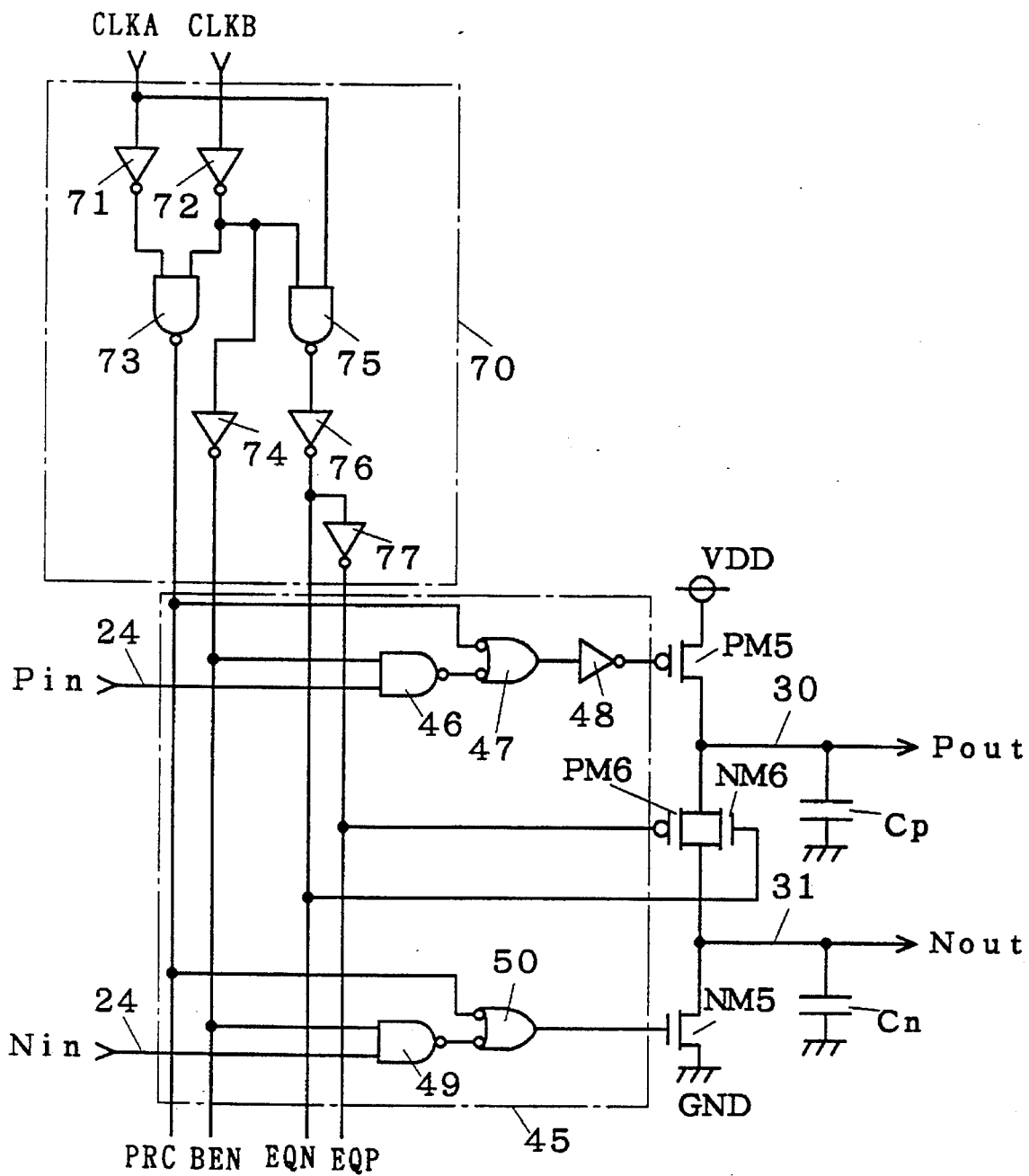
FIG. 13 is a circuit diagram showing the constitution of a bus drive circuit of a bus system of a fourth preferred embodiment of the invention and its control circuit.

The bus system according to a fourth preferred embodiment of the invention is described by reference to FIG. 13 and FIG. 14. FIG. 13 is a circuit diagram showing the constitution of the bus drive circuit and its control circuit. In FIG. 13, reference numeral 70 is a control circuit for generating a control signal by using two clocks CLKA, CLKB which differ in phase by ¼ period. mutually, and other parts correspond to same reference numerals in FIG. 7. The control circuit 70 comprises an inverter 71 for inverting the clock CLKA, an inverter 72 for inverting the clock CLKB, a NAND gate 73 for outputting a non-conjunction of the outputs of the inverters 71, 72, an inverter 74 for inverting the output of the inverter 72, a NAND gate 75 for outputting a non-conjunction of the clock CLKA and output of the inverter 72, an inverter 76 for inverting the output of the NAND gate 75, and an inverter 77 for inverting the output of the inverter 76. The output of the NAND gate 73 is a precharge signal PRC, the output of the inverter 74 is an enable signal BEN, the output of the inverter 76 is an equalizing signal EQN, and the output of the inverter 77 is an equalizing signal EQP.

Figure 14:
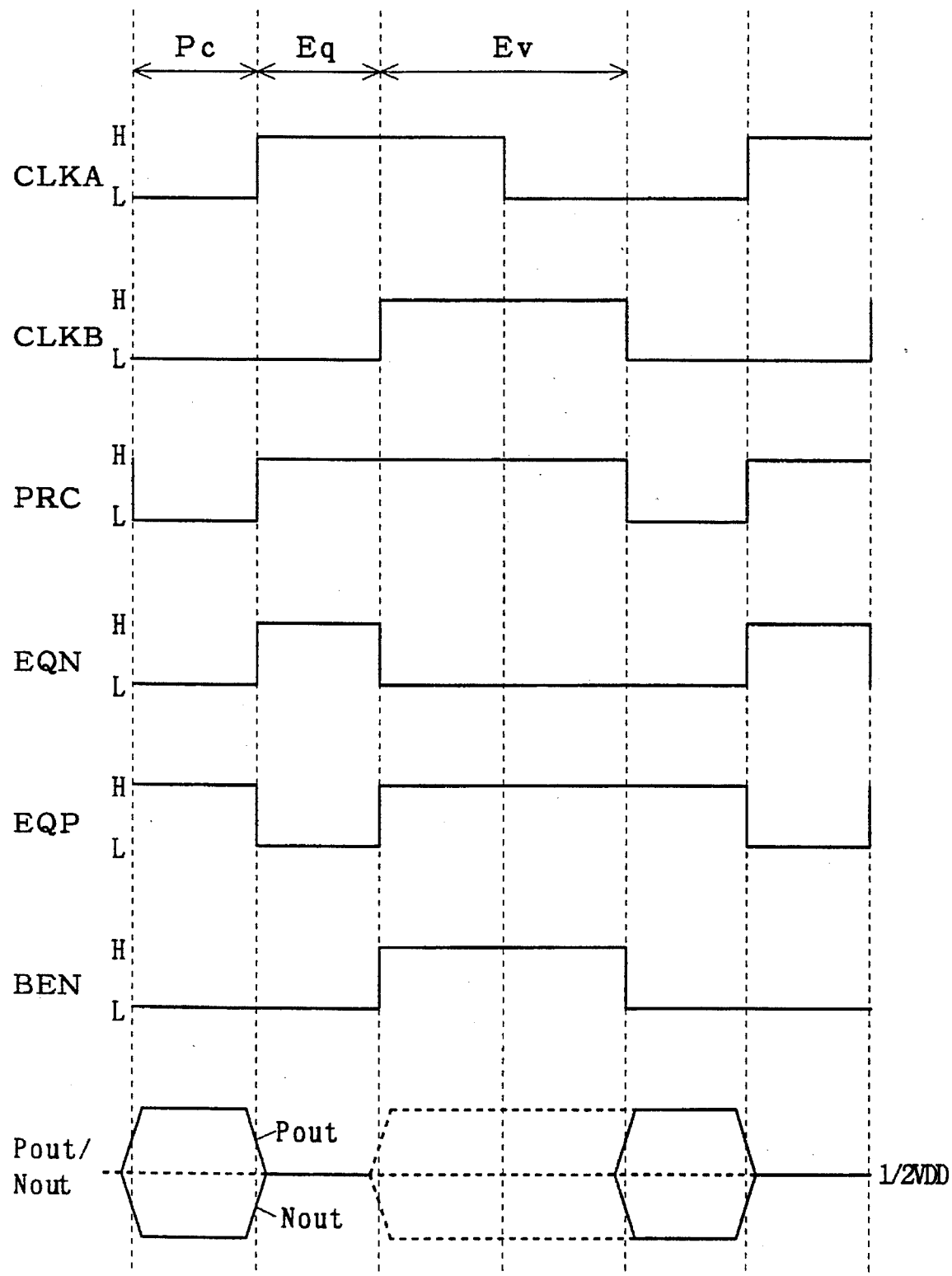
FIG. 14 is a timing chart showing the operation of the bus drive circuit and its control circuit shown in FIG. 13.

The operation of the control circuit shown in FIG. 13 is shown in the timing chart in FIG. 14. The operation of the converting circuit 45 and transistors PM5, PM6, NM5, NM6 is same as explained in the second preferred embodiment. Incidentally, between the control circuit 35 and control circuit 70, although the circuit construction and synchronizing clocks are different, the control signals outputted by the control circuit 70 in the precharge period Pc, equalizing period Eq, and data transfer period Ev are same as in the control circuit 35 explained in the second preferred embodiment.

Meanwhile, the control signals used for setting the precharge period Pc, equalizing period Eq, and data transfer period Ev used in the bus system shown in FIG. 1, and the constitution of the bus drive circuit controlled in its control circuit are not limited to the foregoing preferred embodiments, but the same effects as in the preferred embodiments may be obtained in other circuit construction.

The receiver circuit and its control circuit used in the bus system shown in FIG. 1 are not limited to the foregoing preferred embodiments alone.

Preferred embodiment 5

Figure 15:
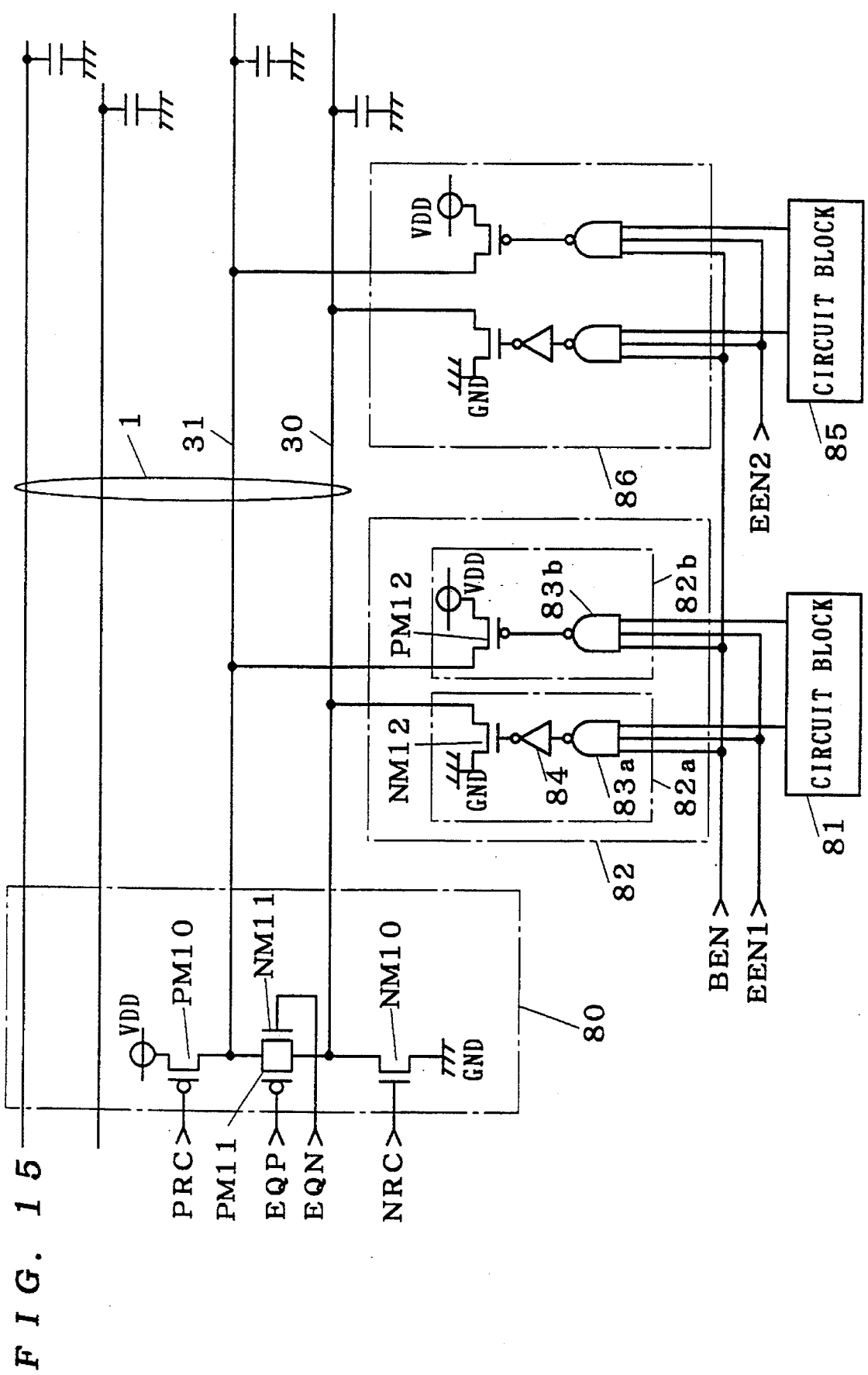
FIG. 15 is a block diagram showing other constitution of the bus system of the invention.

In the preceding preferred embodiments, precharging and equalizing are done by the bus drive circuit, but as shown in FIG. 15, a precharge-equalize exclusive circuit 80 may be provided for precharging and equalizing the bus 1. In FIG. 15, reference numeral 80 is the precharge-equalize exclusive circuit for precharging and equalizing the bus 1 controlled and connected by control signal PRC and others from the control circuit not shown herein, 81, 85 are circuit blocks, 82 is a bus drive circuit for transmitting the output of the circuit block 81 through the bus 1, and 86 is a bus drive circuit for transmitting the output of the circuit block 85 through the bus 1.

The bus drive circuit 82 comprises data line drive circuits 82a, 82b, and others. The data line drive circuit 82a comprises an N channel MOS transistor NM12 having a source connected to the grounding line, a drain connected to the data line 30 of the bus 1, and a gate, a NAND gate 83a for outputting a non-conjunction of the enable signal BEN given from the output of the circuit block and control circuit, and enable signal EEN1 for controlling permission or non-permission of action of the bus drive circuit 82, and an inverter 84 for inverting the output of the NAND gate 83a and transmitting to the gate of the N channel MOs transistor NM12. The data line drive circuit 82b comprises a P channel MOS transistor PM12 having a source connected to the grounding line, a drain connected to the data line 31 of the bus 1, and a gate, and a NAND gate 83b for outputting a NAND of the enable signal BEN given from the output of the circuit block and control circuit and the enable signal EEN1 to the gate of the P channel MOS transistor PM12. The bus drive circuit 86 is controlled by other enable signal EEN2 and enable signal BEN.

The precharge-equalize exclusive circuit 80 comprises a P channel MOS transistor PM10 having a source connected to the power source line, a gate for receiving the precharge signal PRC, and a drain connected to the second data line 31, an N channel MOS transistor NM10 having a source connected to the grounding line, a gate for receiving the precharge signal NRC, and a drain connected to the first data line 30, a P channel MOS transistor PM11 having an equalizing signal EQP given to the gate connected between the first and second data lines 30, 31, and an N channel MOS transistor PM11 having an equalizing signal EQN given to the gate connected between the first and second data lines 30, 31, among others. If the number of data lines is 2×n, the circuit shown in the diagram is prepared by n pieces. If the number of data lines is an odd number, for example, a dummy data line may be prepared. The bus drive circuit 82 and precharge-equalize exclusive circuit 80 shown in FIG. 15 are combined to operate same as the bus drive circuit 23 shown in FIG. 1. That is, the transistor PM5 shown in FIG. 3 operates same as the function of the transistors PM10, PM12 shown in FIG. 15, and the transistor NM5 shown in FIG. 3 operates same as the function of the transistors NM10, NM12 shown in FIG. 15.

When the enable signals BEN and EEN1 are at high level, the transistors PM12, NM12, etc. conduct selectively depending on the output of the circuit block 81. The enable signal BEN becomes high level until the next precharge period after completion of precharge period and equalizing period. The enable signal EEN2 is at low level when the enable signal EEN1 is at high level. The enable signals EEN1, EEN2, etc. make only one of the plural bus drive circuits in active state within one data transfer period. It is, for example, the data receiver RVP shown in FIG. 5 that receives the information of the data line driven by the P channel MOS transistor, and it is, for example, the data receiver RVN shown in FIG. 5 that receives the information of the data line driven by the N channel MOS transistor. When the bus 1 is long, in order to shorten the precharging and equalizing time, plural precharge-equalize exclusive circuits 80 may be also provided.

While the invention has been shown and described in detail, the foregoing description is in all aspects illustrative and not restrictive. It is therefore understood that numerous modifications and variations can be devised without departing from the scope of the invention.

I claim:

1. A bus drive circuit being formed in an integrated circuit for driving a bus for transmitting different information in each data line in the sequence of precharge period, equalizing period, and data transfer period, comprising:

first switch means formed in said integrated circuit, and connected between first and second data lines having specific capacities being included in said bus, for connecting said first and second data lines in said equalizing period in response to an equalizing signal showing said equalizing period, second switch means formed in said integrated circuit, having a first terminal connected to said first data line and a second terminal connected to a first power source, for connecting between said first terminal and said second terminal in said precharge period, third switch means formed in said integrated circuit, having a first terminal connected to said second data line, and a second terminal connected to a second power source, for connecting between said first terminal and said second terminal of said third switch means in said precharge period, and at least either one of fourth switch means and fifth switch means formed in said integrated circuit, said fourth switch means having a first terminal connected to said first data line, a second terminal connected to a first power source, and a control terminal for receiving a first input signal showing the information to be transmitted by said first data line, for selectively connecting between said first terminal and said second terminal of said fourth switch means on the basis of said first input signal received by said control terminal of said fourth switch means in said data transfer period, said fifth switch means having a first terminal connected to said second data line, a second terminal connected to a second power source, and a control terminal for receiving a second input signal showing the information to be transmitted by said second data line, for selectively connecting between said first terminal and said second terminal of said fifth switch means on the basis of said second input signal to be received by said control terminal of said fifth switch means in said data transfer period.

2. A bus drive circuit of claim 1, wherein said first switch means comprises a MOS transistor for equalizing having a first current electrode connected to said first data line, a second current electrode connected to said second data line, and a control electrode for receiving said equalizing signal.

3. A bus drive circuit of claim 1, wherein said second switch means comprises a first MOS transistor of first conductive type having a first current electrode connected to said first data line, a second current electrode connected to said first power source, and a control electrode for receiving a precharge signal showing said precharge period, said third switch means comprises a second MOS transistor of second conductive type having said first current electrode connected to said second data line, a second electrode connected to said second power source, and a control electrode for receiving said precharge signal, said fourth switch means comprises a third MOS transistor of first conductive type having a first current electrode connected to said first data line, a second current electrode connected to said first power source, and a control electrode for receiving said first input signal, and said fifth switch means comprises a fourth MOS transistor of second conductive type having a first current electrode connected to said second data line, a second current electrode connected to said second power source, and a control electrode for receiving said second input signal.

4. A bus drive circuit being formed in an integrated circuit for driving a bus for transmitting different information in each data line in the sequence of precharge period, equalizing period, and data transfer period, comprising:

first switch means formed in said integrated circuit, and connected between first and second data lines having specific capacities being included in said bus, for connecting said first and second data lines in said equalizing period in response to an equalizing signal showing said equalizing period, second switch means formed in said integrated circuit, having a first terminal connected to said first data line, a second terminal connected to a first power source, and a control terminal for receiving a first input signal for showing the information to be transmitted by said first data line, connecting between said first terminal and said second terminal in said precharge period, and selectively connecting between said first terminal and said second terminal on the basis of a first input signal received by said control terminal in said data transfer period, and third switch means formed in said integrated circuit, having a first terminal connected to said second data line, a second terminal connected to a second power source, and a control terminal for receiving a second input signal showing information to be transmitted by said second data line, connecting between said first terminal and said second terminal of said third switch means in said precharge period, and selectively connecting between said first terminal and second terminal of said third switch means on the basis of said second input signal received by said control terminal of said third switch means in said data transfer period.

5. A bus drive circuit of claim 4, wherein said first switch means comprises a MOS transistor for equalizing having a first current electrode connected to said first data line, a second current electrode connected to said second data line, and a control electrode for receiving said equalizing signal.

6. A bus drive circuit of claim 4, wherein said second switch means comprises a first MOS transistor of first conductive type having a first current electrode connected to said first data line, a second current electrode connected to said first power source, and a control electrode for receiving said first input signal, and said third switch means comprises a first current electrode connected to said second data line, a second current electrode connected to said second power source, and a second MOS transistor of second conductive type having a control electrode for receiving a second input terminal.

7. A bus drive circuit of claim 4, wherein said second switch means comprises:

a first MOS transistor of first conductive type having a first current electrode connected to said first data line, a second current electrode connected to said first power source, and a control electrode, and a first converting circuit for receiving a precharge signal, said equalizing signal, and a first input signal, and outputting a signal for setting said first MOS transistor in conductive state in said precharge period, a signal for setting said first MOS transistor in non-conductive state in said equalizing period, and said first input signal in said data transfer period, to said control electrode of said first MOS transistor, and said third switch means comprises:

a second MOS transistor of second conductive type having a first current electrode connected to said second data line, a second current electrode connected to said second power source, and a control electrode, and a second converting circuit receiving said precharge signal, said equalizing signal, and a second input signal, and outputting a signal for setting said second MOS transistor in conductive state in said precharge period, a signal for setting said second MOS transistor in non-conductive state in said equalizing period, and said second input signal in said data transfer period, to said control electrode of said second MOS transistor.

8. A bus system comprising:

a bus provided in a integrated circuit, having plural data lines including a first data line having a first capacity and a second data line having a second capacity, for transmitting information between plural circuit blocks by passing sequentially through a precharge period for connecting said first data line to a first power source and connecting said second line to a second power source, an equalizing period for not connecting said plural data lines to said first and second power sources and connecting said first data line and second data line mutually, and a data transfer period for transmitting different information to each data line, a bus drive circuit comprising first switch means formed in said integrated circuit, and connected between said first and second data lines, for connecting said first and second data lines in said equalizing period depending on an equalizing signal showing said equalizing period, second switch means formed in said integrated circuit, having a first terminal connected to said first data line, a second terminal connected to a first power source, and a control terminal for receiving a first input signal showing information to be transmitted by said first data line, for connecting between said first terminal and said second terminal of said second switch means in said precharge period, and selectively connecting between said first terminal and said second terminal of said second switch means on the basis of said input signal received by said control terminal of said second switch means in said data transfer period, and third switch means formed in said integrated circuit, having a first terminal connected to said second data line, a second terminal connected to a second power source, and a control terminal for receiving a second input signal showing the information to be transmitted through said second data line, for connecting between said first terminal and said second terminal in said precharge period, and selectively connecting between said first terminal and said second terminal on the basis of said second input terminal received at said control terminal in said data transfer period, a receiver circuit provided in said integrated circuit, and connected at least to one of said first and second data lines, for outputting a signal swinging between a potential outputted by said first power source and a potential outputted by said second power source, depending on the signal transmitted through said first or second data line, and a control circuit provided in said integrated circuit, and connected at least to said bus drive circuit and said receiver circuit, for outputting at least a data transfer signal for indicating said data transfer period.

9. A bus system of claim 8, wherein said receiver circuit comprises:

a first MOS transistor of first conductive type having a control electrode connected to said first or second data line, a first current electrode connected to said first or second power source, and a second current electrode, a second MOS transistor of first conductive type having a first current electrode connected to said second current electrode of said first MOS transistor, a control electrode for receiving said data transfer signal, and a second current electrode connected to a signal line possessing a specific capacity, and a third MOS transistor of second conductive type having a first current electrode connected to either said first or second power source to which said first current electrode of said first MOS transistor is not connected, a second current electrode connected to said signal line, and a control electrode for receiving said data transfer signal, wherein said second MOS transistor is in non-conductive state and said third MOS transistor is in conductive state in other period than data transfer period, and, in said data transfer period when receiving a signal from a data line, said second MOS transistor is in conductive state and said third MOS transistor is in non-conductive state.

10. A bus system of claim 8, wherein said control circuit generates a precharge signal showing a precharge period of a quarter of a first clock, an equalizing signal showing an equalizing period of a quarter of said first clock, and said data transfer signal showing a data transfer period of a half period of said first clock from said first clock and a second clock having a doubled frequency of said first clock and sometimes coinciding with the rise timing of said first clock.

11. A bus system of claim 8, wherein said control circuit generates a precharge signal showing a precharge period of a quarter of a first clock, an equalizing signal showing an equalizing period of a quarter of said first clock, and said data transfer signal showing a data transfer period of a half period of said first clock from said first clock and a second clock having same frequency of said first clock and differing in phase by a quarter period from said first clock.

* * * * *